United States Patent [19]
Kubota et al.

[11] Patent Number: 5,956,021
[45] Date of Patent: Sep. 21, 1999

[54] METHOD AND DEVICE FOR INPUTTING INFORMATION FOR A PORTABLE INFORMATION PROCESSING DEVICE THAT USES A TOUCH SCREEN

[75] Inventors: Jun'ichi Kubota, Sanda; Yoshio Yamamoto, Katano; Yukie Syoda, Moriguchi, all of Japan

[73] Assignee: Matsushita Electric Industrial Co., Ltd., Osaka, Japan

[21] Appl. No.: 08/717,352
[22] Filed: Sep. 20, 1996
[30] Foreign Application Priority Data Sep. 20, 1995 [JP] Japan ................................ 7-241344

[51] Int. Cl.⁶ ........................................... G09G 5/00
[52] U.S. Cl. .............................. 345/179; 345/173
[58] Field of Search ........................ 345/179, 173, 345/358; 382/186, 187, 188; 178/18, 19, 20

[56] References Cited

U.S. PATENT DOCUMENTS

| | | | |
|---|---|---|---|
| 5,148,155 | 9/1992 | Martin et al. | 345/179 |
| 5,166,666 | 11/1992 | Tanaka | 345/179 |
| 5,416,904 | 5/1995 | Arai et al. | 345/179 |
| 5,561,446 | 10/1996 | Montlick | 345/173 |
| 5,570,113 | 10/1996 | Zetts | 345/179 |
| 5,571,997 | 11/1996 | Gray et al. | 345/179 |
| 5,579,037 | 11/1996 | Tahara et al. | 345/173 |

*Primary Examiner*—Jeffery A. Hofsass
*Assistant Examiner*—John Tweel, Jr.
*Attorney, Agent, or Firm*—Price Gess & Ubell

[57] ABSTRACT

An input device comprising LCD panel 106, tablet 108 which is set thereon, wherein representative keys are displayed on LCD panel 106. When pen 109 touches a key, the key is expanded. If pen 109 continues pressing the key, the displayed key changes to its related key. When pen 109 is lifted up from tablet 108, a key corresponding to a position on tablet 108 from which pen 109 has been lifted up is determined as an input key.

29 Claims, 20 Drawing Sheets

Fig. 11

|   | 308 | 309 | 310 | 311 | 312 | 313 |
|---|---|---|---|---|---|---|
| あ | 10,10 | 10,10 | 10,10 | 10,10 |  | 1 |
| い | 20,10 | 5,10 | 15,10 | 10,10 |  | 1 |
| う | 25,10 | 5,10 | 20,10 | 10,10 |  | 1 |

Fig. 17

|   | 308 | 309 | 310 | 311 | 312 | 313 |
|---|---|---|---|---|---|---|
| か | 20,10 | 10,10 | 20,10 | 10,10 |  | 1 |
| き | 20,20 | 0,0 | 20,20 | 10,10 |  | 1 |
| く | 20,30 | 0,0 | 20,30 | 10,10 |  | 1 |

METHOD AND DEVICE FOR INPUTTING INFORMATION FOR A PORTABLE INFORMATION PROCESSING DEVICE THAT USES A TOUCH SCREEN

BACKGROUND OF THE INVENTION (1) Field of the Invention

The present invention relates to a method and device for inputting information for a portable information processing device: more specifically, it relates to a method and device for inputting information by touching keys displayed on the screen with a pen.

(2) Description of the Prior Art

Pen input portable information processing devices are getting more and more popular these days. FIG. 1 is an example of the outward appearance of such a portable information processing device. In order to create a document or a directory, an operator of portable information processing device 10 touches keys on a virtual keyboard (hereinafter referred to as just "keyboard") displayed on screen 30, using a pen.

FIGS. 2A and 2B are examples of screen layouts, showing the input method for a conventional portable information processing device. FIG. 2A shows a screen layout for inputting Japanese characters, while FIG. 2B shows a screen layout for inputting English characters and numerals. By switching between these two types of screens when necessary, various types of characters can be inputted.

Specifically, the screen of this device is divided into four display areas: text edit area 201 for displaying a text to be edited; conversion area 202 for converting a set of kana (phonetic Japanese characters) into kanji (Chinese characters); control key area 204 for giving various control indications; and character designation area 203 for designating input characters. The operator can create or edit a document, by using a pen to touch keys displayed on character designation area 203 and control key area 204.

Suppose that a kana keyboard is displayed on character designation area 203 as shown in FIG. 2A. By touching a pen to 英 数 (QWERTY) in control key area 204, character designation area 203 changes to the one shown in FIG. 2B. Likewise, when a QWERTY keyboard is displayed in character designation area 203 as shown in FIG. 2B, it changes to the one shown in FIG. 2A by using the pen to touch か な (Kana) in control key area 204.

As is mentioned above, according to a conventional portable information processing device, various types of key input are possible with a small screen by switching display between various types of keyboards.

However, the conventional input method has the following disadvantages.

(1) Repeatedly applying pressure to the display screen causes hard strain for the operator. It should be noted here that the creation of a document including, for example, Japanese characters, English characters, and numerals, requires switching screens more frequently than the creation of a document comprising only English characters and numerals.

Also, if the operator has touched a pen to a wrong key, he or she has to touch a pen to 削 除 (Delete) in control key area 204, because the wrong input key will have been determined the moment the pen touched the key.

Furthermore, in order to designate related characters having different attributes (upper/lower case characters in English or voiceless/voiced sound or p-sound in Japanese), further pen operations are needed. Specifically, in order to input a lower case letter from the keyboard in FIG. 2B, it is necessary to touch a key in character designation area 203 and then 変 換 (Convert) in control key area 204.

Generally speaking, in handwriting, human beings are more used to horizontal movement of the hand over the manuscript rather than vertical movement. Therefore, repeated vertical movement causes strain on the operator's hand.

(2) As there are many keys on the screen, is easy for the operator to press the wrong key. For example, since 50 phonetic characters called "kana" are necessary to input Japanese, the size of each key on a kana keyboard, such as that shown in FIG. 2A, is extremely small. Therefore, if the operator tries to touch a pen to a desired key quickly, it is easy for the operator to input a wrong key. Especially, when the operator uses the device on his or her palm in the open air, stability is bad and display is unclear. Therefore, he or she is likely to input wrong keys.

SUMMARY OF THE INVENTION

It is a first object of the present invention to provide a method and device for inputting information for a portable information processing device, the method and device realizes a lesser number of vertical pen movements over the manuscript than conventional methods and devices.

Specifically, the present invention enables an operator to do the following: to make a document comprising Japanese characters, English characters, and numerals without switching screens; to cancel a wrong key input without bothering to touch another key for correction; and to input a related character by a single operation of putting the pen onto the tablet and lifting it up.

It is a second object of the present invention to provide a method and device for inputting information for a portable information processing device which enables the operator to input a desired key correctly.

Specifically, according to the present invention, the operator can input a key, confirming the expanded key and doing actions close to natural hand-writing movement in Japanese and English, which is from left to right.

It is a third object of the present invention to provide a method and device for inputting information for a portable information processing device which enables many keys to be arranged on a small screen, without damaging effectiveness in character input.

The objects can be achieved by the following features.

(1) An input device for a portable information processing device that uses a touch screen, the input device comprising: a pen; a screen; a transparent tablet which is one of a set on the screen and embedded in the screen, detects whether the pen is on the tablet and a position of the pen if it is on the tablet, and outputs a signal showing whether the pen is on the tablet and the position of the pen if it is on the tablet; an initial display device for displaying keys on the screen which are some of all selectable keys; a display change device for detecting a latest position of the pen by reading the signal from the tablet when the tablet detects presence of the pen, determining the key corresponding to the latest position as a provisionally selected key, and changing a part of the keys displayed by the initial display device; and an input determination device for detecting whether a pen operation to determine input has been carried out after the pen touches the tablet, and if so, determining a key related to the pen operation as an input key.

Key input is determined not by the moment the pen is put on the tablet but by the pen-dragging action on the tablet. By giving a meaning to each of a plurality of pen-dragging actions on the tablet, a series of operations including putting the pen onto the tablet, dragging it across the tablet, and lifting it up from the table enables the operator to obtain the same result as doing the vertical movement of the pen over the tablet, which means putting the pen onto the tablet and lifting it up from the tablet, twice or more. Therefore, the operator can input a key more correctly using the present device than a conventional one.

(2) The initial display device may display predetermined keys larger than other keys, and the display change device may expand the provisionally selected key.

The operator can confirm the expanded key before determining the key input. Therefore, it is possible to avoid wrong key input.

Also, as many non-provisionally-selected keys are displayed in a small size, it is possible to arrange much more keys on the screen of the present device than conventional devices.

(3) The display change device may expand the provisionally selected key at least one of leftward and upward.

Even if the provisionally selected key is expanded, size of rightward keys and downward keys does not change. Therefore, the operator can readily select an another key, following a natural hand-writing movement in Japanese and English, which is from left to right or top to bottom on the tablet.

(4) The initial display device may overlay adjacent keys partially, and the display change device may display the provisionally selected key on top of the overlaid keys.

It is possible to arrange many keys on the screen and to minimize the display change on the screen when a new key is selected. Therefore, the screen blink which causes vision problems for the operator can be minimized (5) The display change device may successively change the display of the provisionally selected key to an another key which is related to the provisionally selected key at every given time when the pen continues pressing the provisionally selected key.

When the pen keeps pressing the key for a given time period, the key display successively changes to related keys. When a given operation for determining key input is carried out, the key which was displayed just before the operation is inputted. Therefore, the operator can select a desired key from a group of related keys just by controlling the time period between putting the pen onto the tablet and lifting it up from the tablet.

Also, in the initial screen, only representative keys are displayed. That means it is possible to display a part of Japanese keys, English keys, and numeral keys on the same screen. Therefore, the operator does not have to switch keyboards.

(6) All of the keys may be divided into at least one group of related keys, with the initial display device displaying only a representative key for each group of related keys, and the display change device may change the display of the provisionally selected key to an another key which is related to the provisionally selected key when the pen continues pressing the provisionally selected key and a distance moved by the pen on the tablet is greater than a predetermined value.

(7) All of the keys are divided into at least one group of related keys, with the initial display device displaying only a representative key for each group of related keys, the tablet may detect pen pressure, and the display change device may change the display of the provisionally selected key to an another key which is related to the provisionally selected key when the pen continues pressing the provisionally selected key and a change in pen pressure is greater than a given value.

Even though the pen keeps pressing the key for a given time period, unless a given pen operation is carried out by the operator, the displayed key does not change to an another key.

Therefore, the operator can change the displayed key to an other related key at a desired timing.

(8) All of the keys may be divided into at least one group of related keys, with the initial display device displaying only a representative key for each group of related keys, and the display change device may change the keys so that a row of other keys which have been related to the provisionally selected key is adjacent to the provisionally selected key.

The operator can select a desired key from a group of related keys by dragging the pen outside the representative key.

(9) The input determination device may determine a key corresponding to a position on the tablet from which the pen has been lifted up as the input key on detecting that the pen is lifted up from the tablet.

As the input key is determined by lifting up the pen, even if the operator touches the pen to a wrong key, input of the wrong key can be avoided by dragging the pen to a desired key. Therefore, the operator does not have to carry out a 3-D hand movement. 2-D hand movement on the tablet enables the operator to input a key.

(10) The input determination device may determine a key as the input key on detecting that the pen has been dragged outside the key.

Even if a wrong key is touched by the pen, input of the wrong key can be avoided by lifting the pen up from the tablet. In order to cancel input of a key, a single operation of putting the pen onto the tablet and lifting it up from the tablet can cancel input of a key. It was necessary to do the same operation twice for conventional devices.

(11) The input determination device may determine a key as the input key on detecting that the pen has been dragged outside the key in a given direction.

The operator can determine key input by dragging the pen across the tablet from left to right and dragging the pen outside the desired key in a given direction. Therefore, it is possible to input a key when a desired key is found and to cancel the input when a desired key is not found by expanding display of the keys in a row from right to left.

BRIEF DESCRIPTION OF THE DRAWINGS

These and other objects, advantages and features of the invention will become apparent form the following description thereof taken in conjunction with the accompanying drawings which illustrate a specific embodiment of the invention. In the drawings:

FIG. 11 shows a date example of figure layout information corresponding to the key display example shown in FIG. 10A–10C.

FIG. 17 shows a data example of figure layout information of the input device of the present embodiment;

DESCRIPTION OF THE PREFERRED EMBODIMENTS

Embodiment 1

Figure 1:
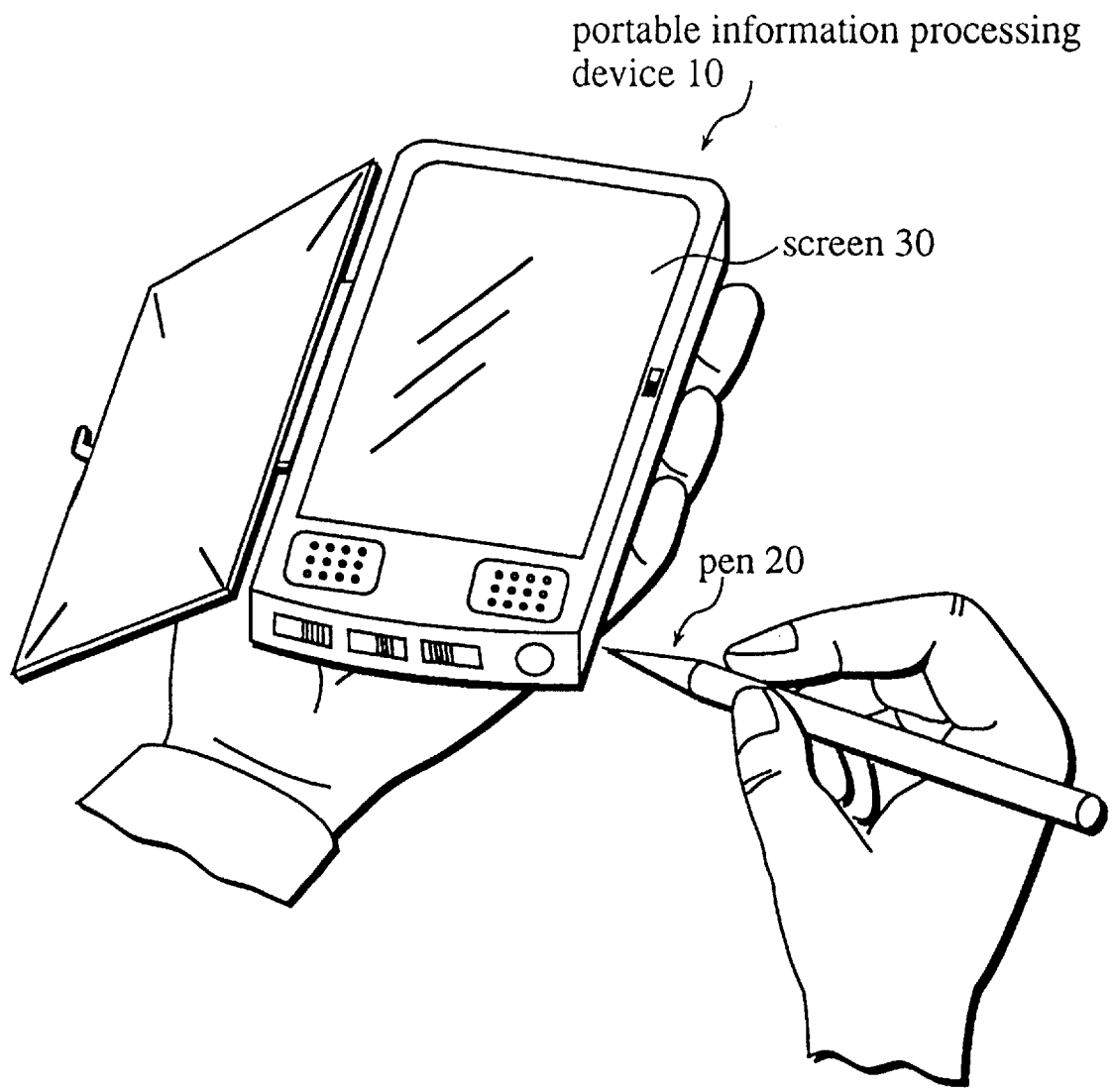
FIG. 1 is an example of the outward appearance of a portable information processing device of prior art and the present invention.
Figure 2A:
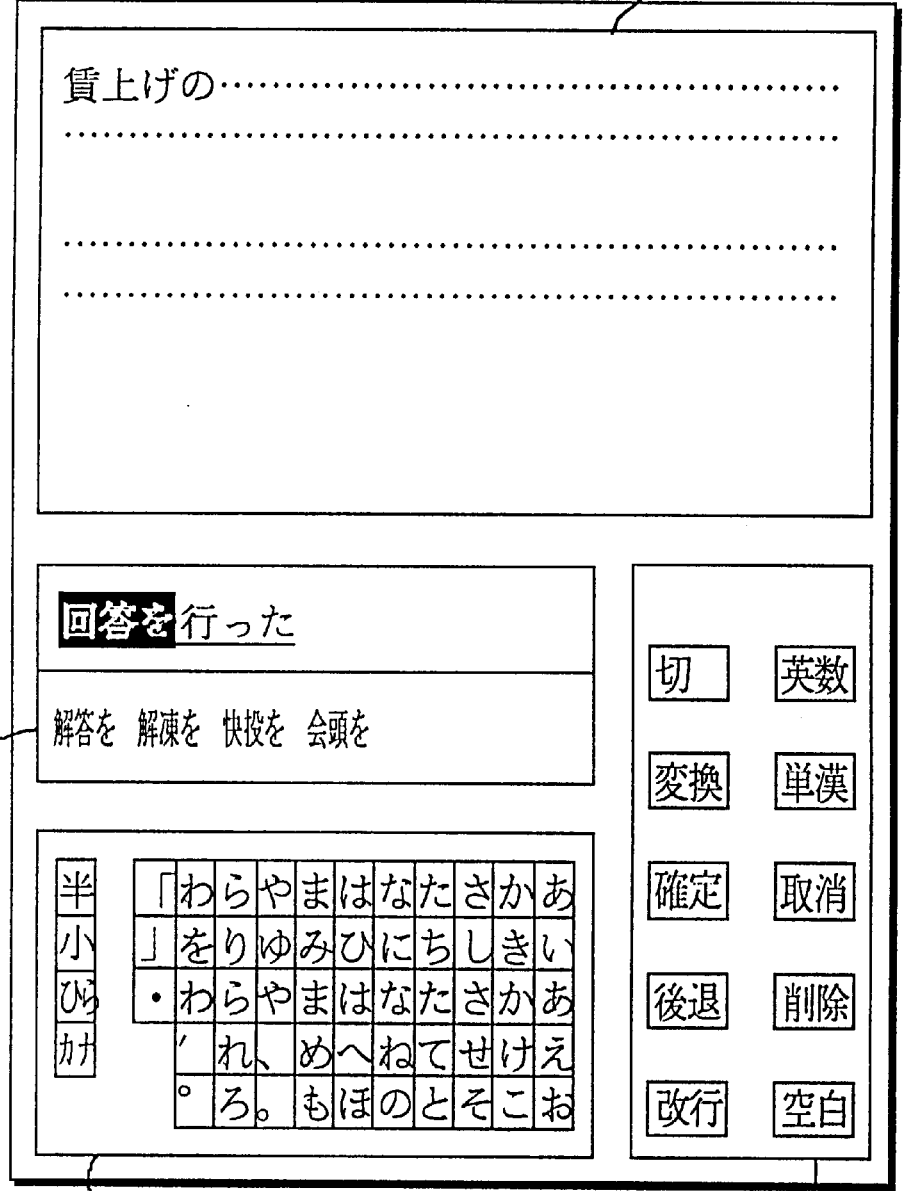
FIG. 2A shows a screen layout for inputting Japanese characters into a conventional portable information processing device.
Figure 2B:
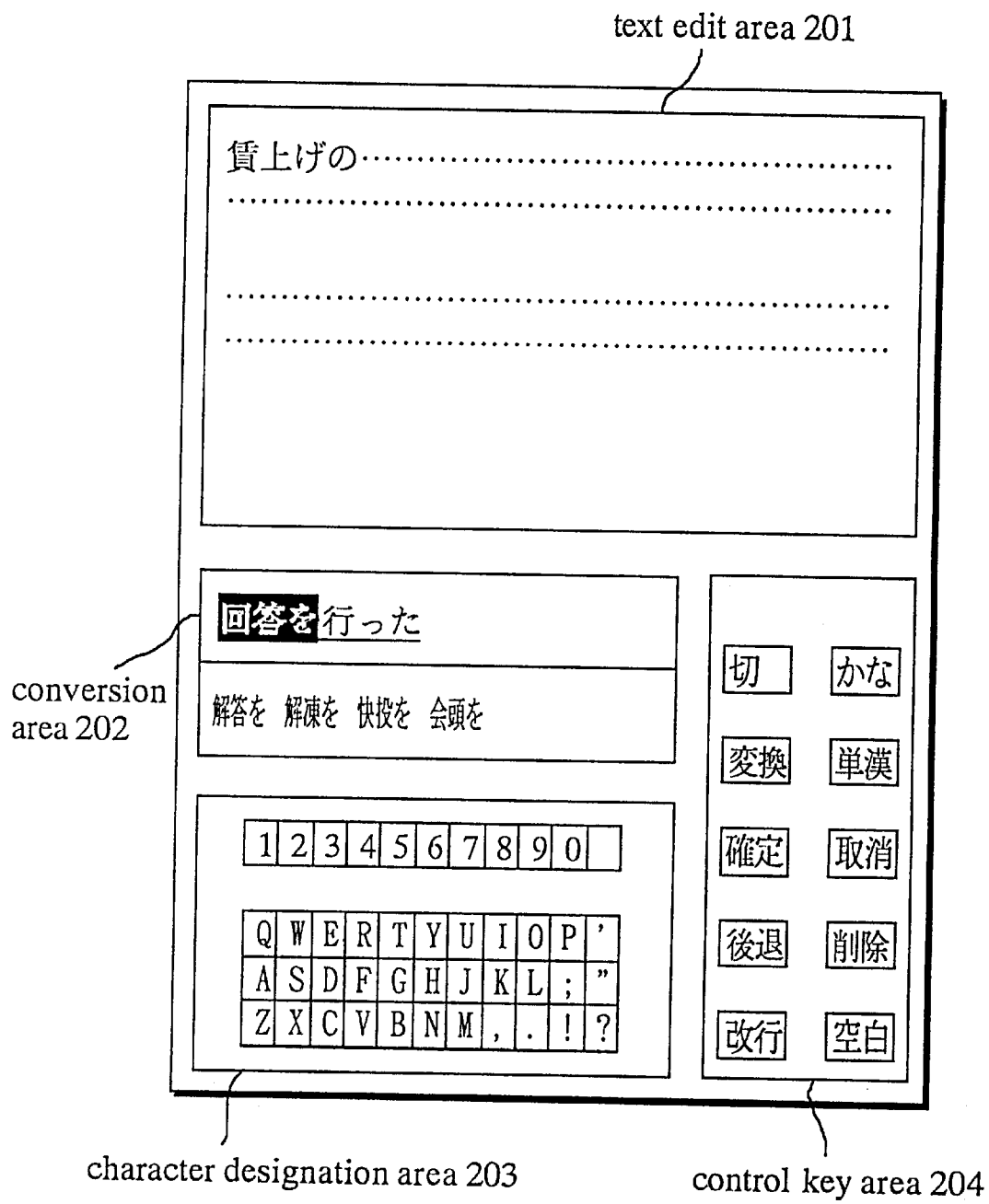
FIG. 2B shows a screen layout for inputting English characters and numerals into a conventional portable information processing device.

An input device of the first embodiment of the present invention can be explained as follows. This input device is used in input unit of the portable information processing device shown in FIG. 1 and realized based on a general computer system.

Figure 3:
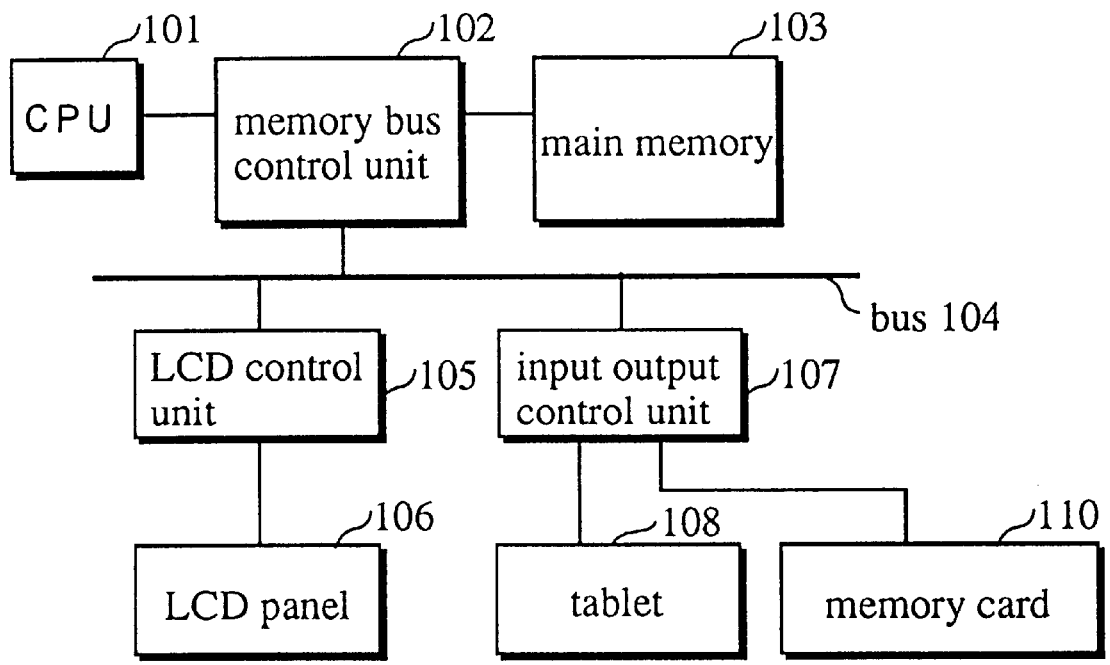
FIG. 3 is a block diagram of construction of input device of the present invention.

FIG. 3 is a block diagram of its construction. CPU 101 is connected to main memory 103 and bus 104 via memory bus control unit 102. Main memory 103 comprises ROM area and DRAM area: ROM area is for storing programs and data, and DRAM area is for temporarily storing them for image control and data processing. Bus 104 is connected to LCD panel 106 via LCD control unit 105. Also, bus 104 is connected to tablet 108 and memory card 110 through input output control unit 107: tablet 108 senses pressing level, and memory card 110 comprises flash memory for storing input text data (flash memory is a type of erasable memory whose contents are not destroyed when the power is turned off). Each of these construction elements can be a standard product which is commercially available. Since they are not the focus of the present invention, detailed explanation of them is not given here.

Input device of the present embodiment stores a program in ROM area of main storage 103, the program including a processing procedure shown in flowcharts which will be explained later. CPU 101 controls each device, referring to and deciphering the program.

Figure 4:
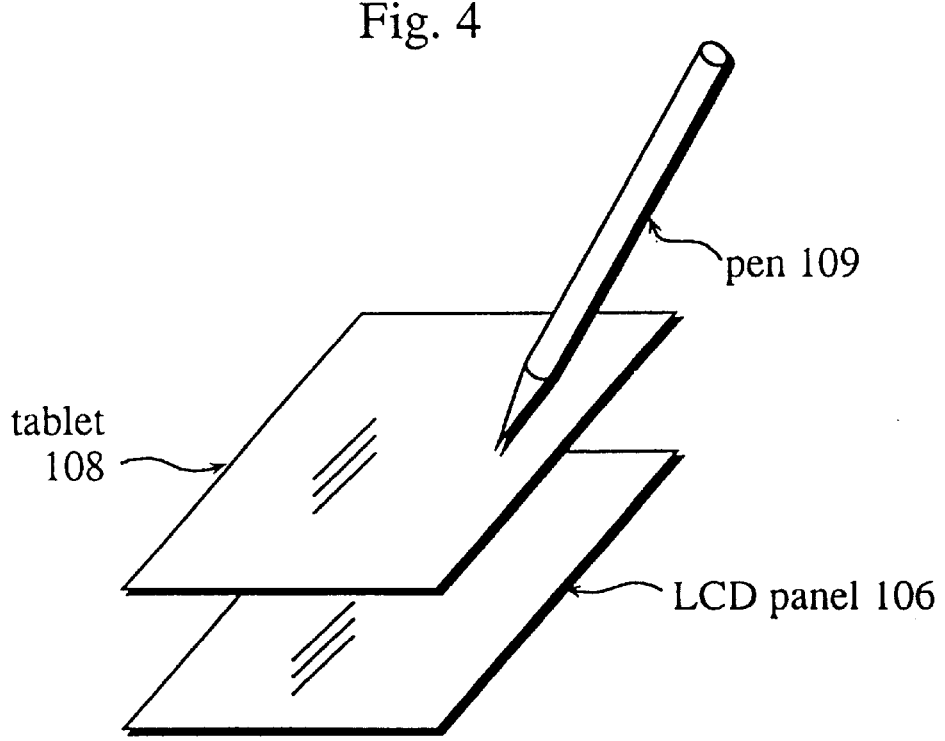
FIG. 4 shows how tablet 108 and LCD panel 106 of the input device of the present invention are positioned.

FIG. 4 shows how tablet 108 and LCD panel 106 are positioned. Key input is carried out in the following way: The operator sees figures displayed on LCD panel 106 and touches corresponding positions on tablet 108 with stylus pen 109. Although it is not illustrated, tablet 108 comprises two flat resistance members that are face-to-face with each other, one detecting a position on the X-axis and the other detecting a position on the Y-axis. When pen 109 presses tablet 108, the members come into contact at the pressed point. A voltage is placed onto each member. And divided voltage is obtained. Then, contact resistance values showing pressure is detected.

Figure 5:
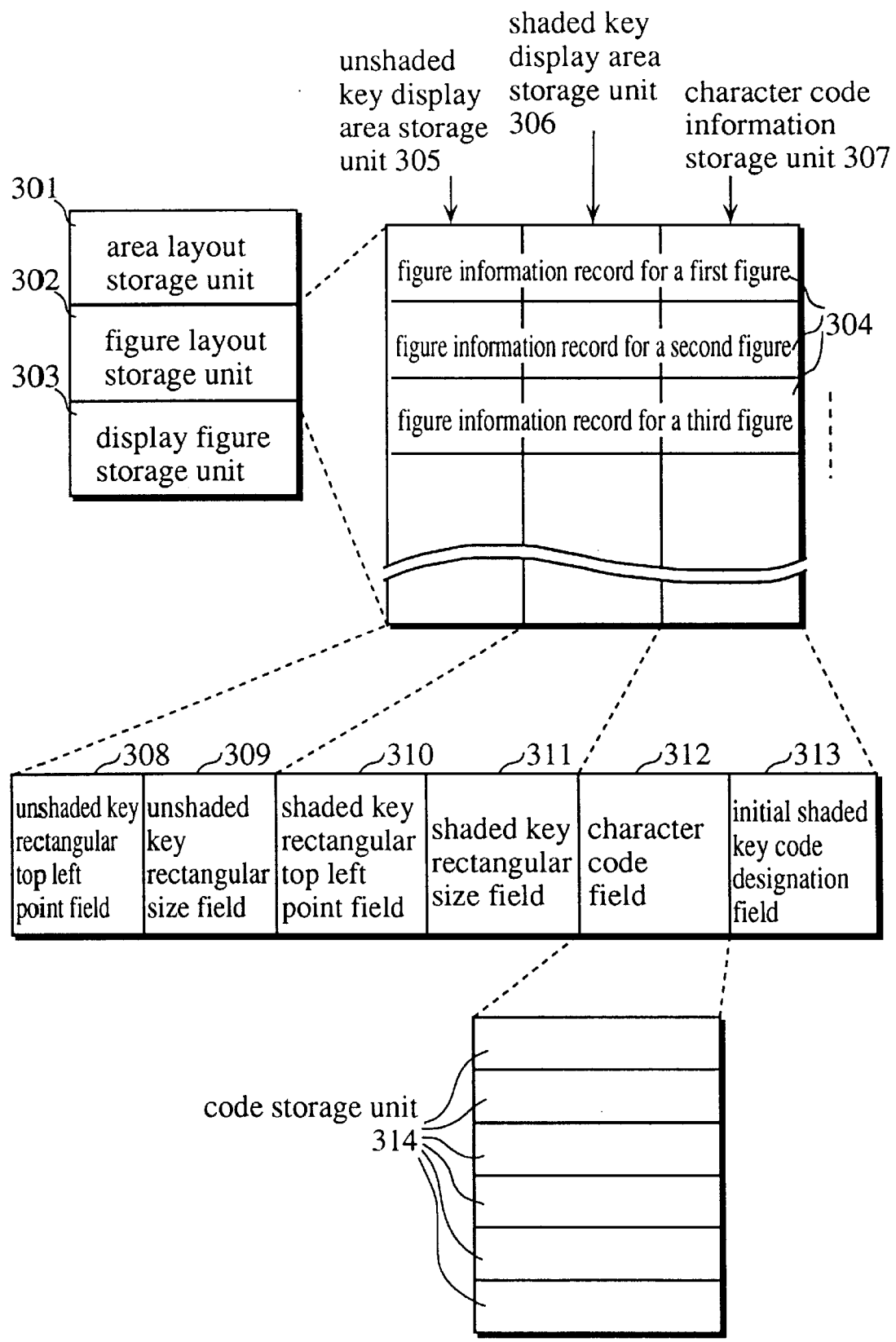
FIG. 5 is data structure of various display information in main memory 103.
Figure 6:
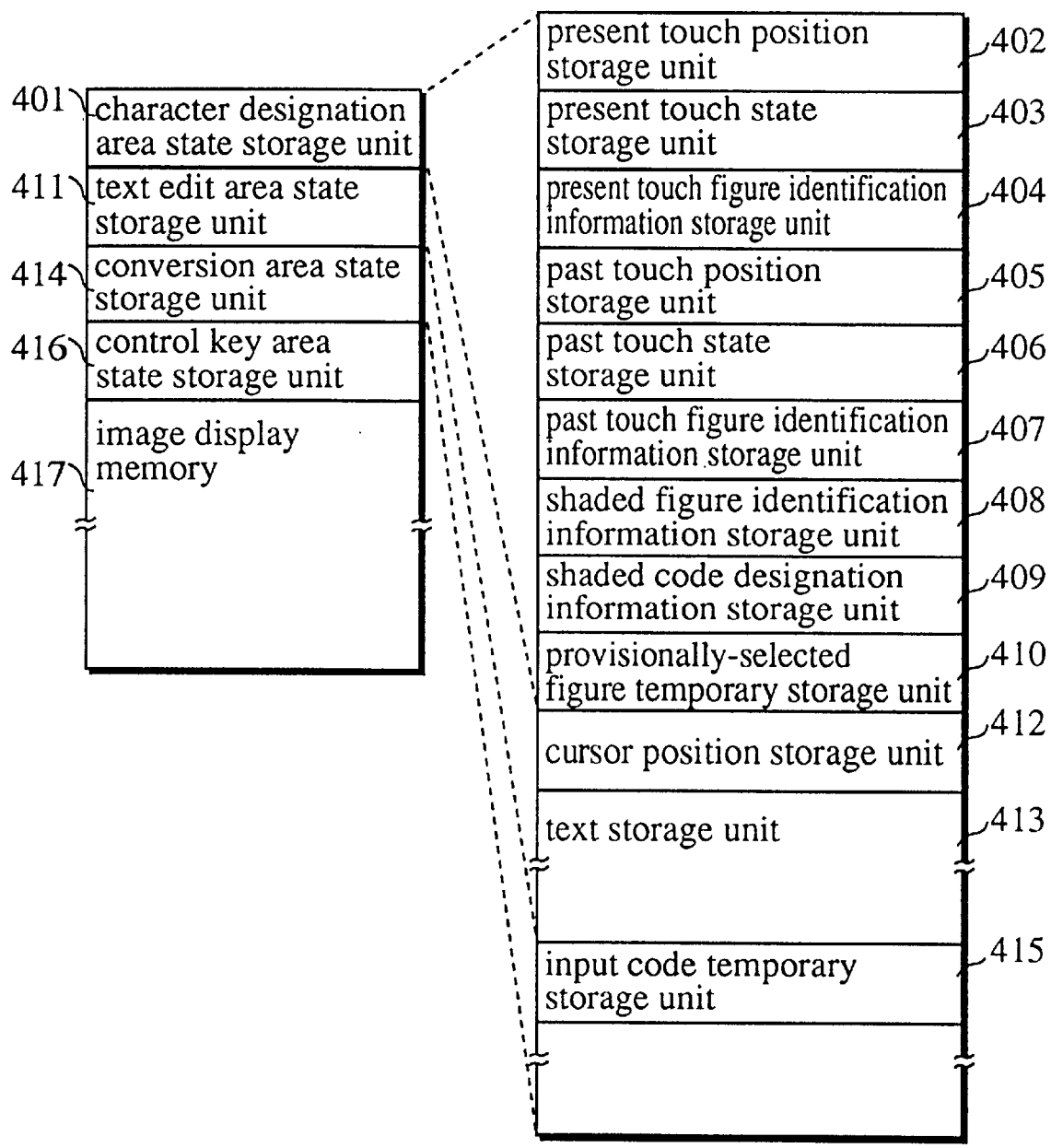
FIG. 6 shows data structure of control information temporarily stored in main memory 103.
Figure 7:
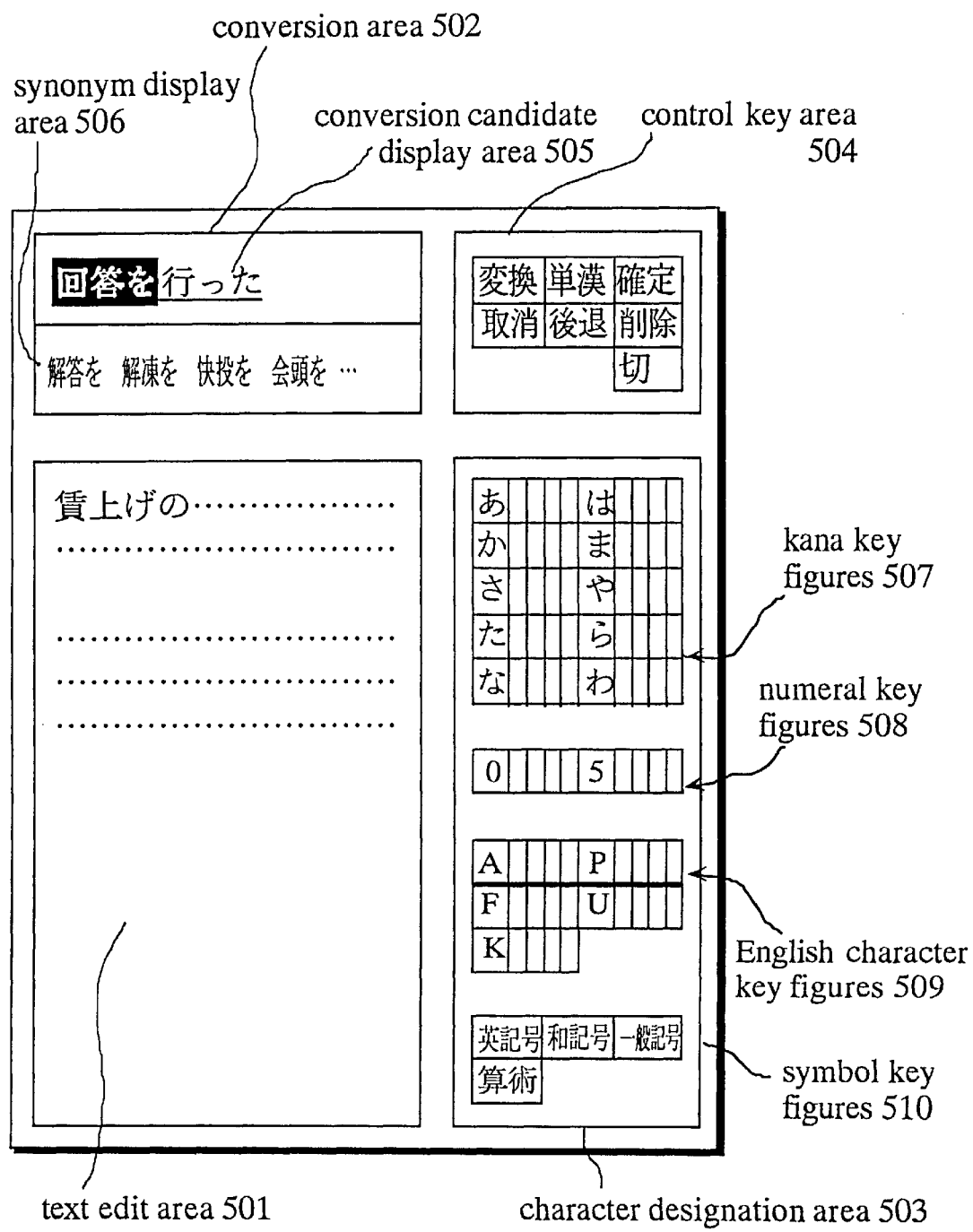
FIG. 7 shows the entire screen layout of the input device of the first embodiment of the present invention.
Figure 8A:
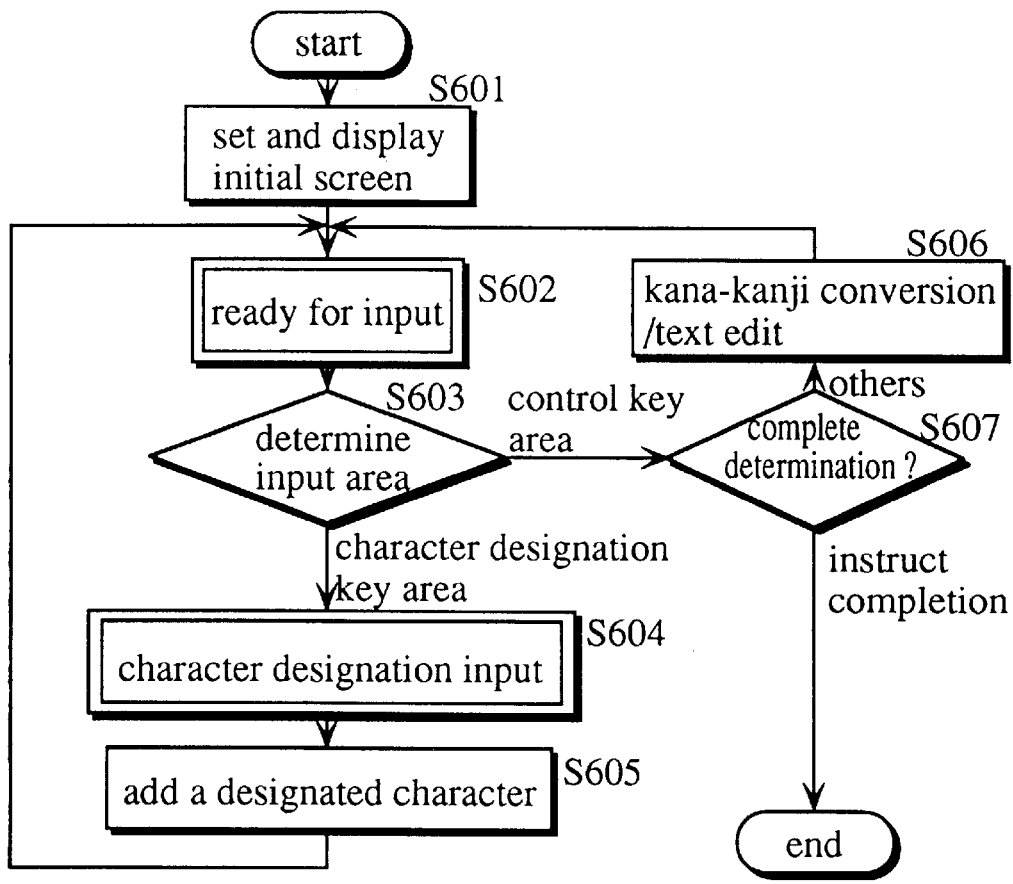
FIG. 8A is a flowchart showing entire operations of the input device of the first embodiment.
Figure 8B:
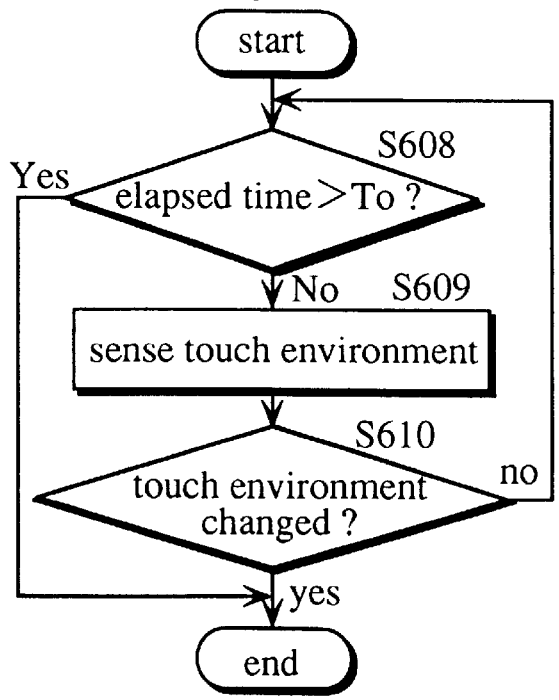
FIG. 8B is a flowchart showing details of Step 604 shown in FIG. 8A.
Figure 9:
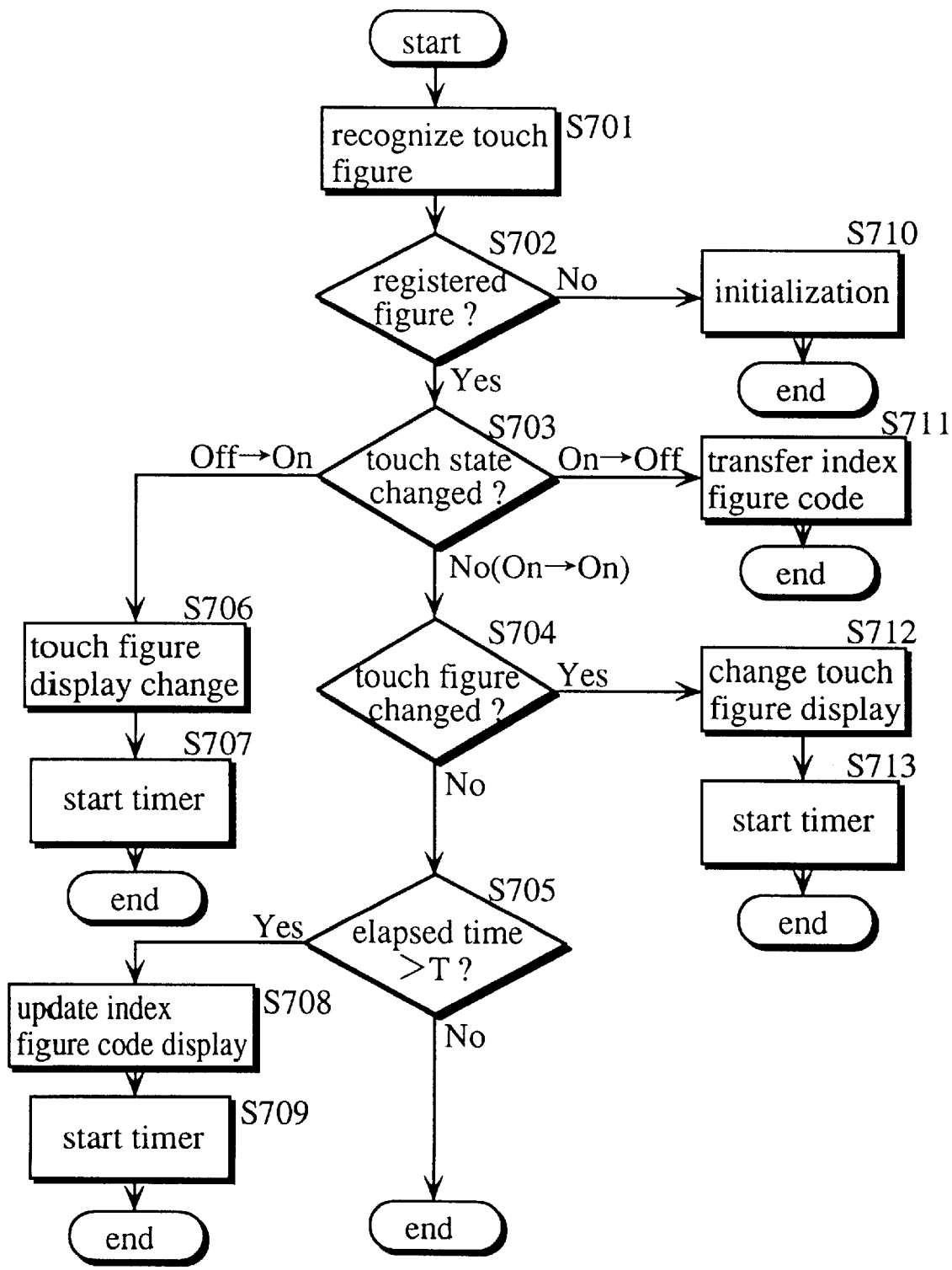
FIG. 9 is a flowchart showing details of Step 602 shown in FIG. 8A.

FIGS. 5 and 6 show relations between each storage area of the present device. FIG. 7 shows the entire screen layout of the present device. FIGS. 8A, 8B, and 9 are flowcharts showing operations of the present device. FIGS. 10A to 10C, FIGS. 12A to 12G, and FIGS. 13A to 13J show displayed keys. FIG. 11 shows contents in the storage area corresponding to FIGS. 10A to 10C. FIG. 5 is data structure in main memory 103, showing each of the display information to be displayed on LCD panel 106 is stored as a figure area information record which includes rectangular figures, their layouts, and their corresponding character codes.

Display information is divided and stored in area layout storage unit 301, figure layout storage unit 302, and display figure storage unit 303.

Area layout storage unit 301 stores positions of the following and construction of them: a text edit area for displaying and editing text information; a conversion area for displaying and editing kana-kanji conversion process information; a character designation area for designating types of characters; and a control key area for inputting instructions to control operations of the device.

Figure layout storage unit 302 stores figure information records 304, each corresponding to rectangular figure information on the screen. Each figure information record 304 comprises unshaded key display area storage unit 305, shaded key display area storage unit 306, and character code information storage unit 307.

Unshaded key display area storage unit 305 comprises unshaded key rectangular top left point field 308 and unshaded key rectangular size field 309. Shaded key display area storage unit 306 comprises shaded key rectangular top left point field 310 and shaded key rectangular size field 311: each stores 2-D dot values on the assumption that screen width is X-axis and screen length is Y-axis.

Character code information storage unit 307 comprises character code field 312 for storing a set of character codes, each corresponding to figure information record 304 and initial shaded key code designation field 313 for designating which of the codes to become unshaded key display. Normally, initial shaded key code designation field 313 stores "1" showing leading code of character code field 312. Character code field 312 comprises code storage unit 314 for storing codes up to six, each corresponding to figure information record 304. Order of the codes is determined according to their attributes. In the case of Japanese characters, it is determined as follows: voiceless-sound hiragana (a cursive form of kana); contracted-sound hiragana; voiced-sound hiragana; p-sound hiragana; voiceless-sound katakana (a square form of kana); contracted-sound katakana; voiced-sound katakana; and p-sound katakana. In the case of English characters, the following order is determined: upper-case character; lower-case character; upper-case character with carron; upper-case character with circumflex; lower-case character with macron; and lower-case character with circumflex. Depending on the language, it is probable that fewer character codes are used. In such a case, invalid codes are registered to supplement code storage unit 314.

Display figure storage unit 303 is ROM area, storing a figure corresponding to the character code as binary information.

FIG. 6 shows data structure of various variable information and buffer during processing and the like which are temporarily stored in main memory 103 when the operator touches a rectangular figure displayed on LCD panel 106 with pen 109.

Character designation area state storage unit 401 stores various variables concerning character designation and comprises the following: present touch position storage unit 402 for storing a present touch position on the screen; present touch state storage unit 403 for storing present touching pressure; present touch figure identification information storage unit 404 for storing present identification information of the touch figure as a record number of figure information record 304; past touch position storage unit 405 for storing a past touch position; past touch state storage unit 406 for storing a past touching pressure; past touch figure identification information storage unit 407 for storing past identification information of the touch figure as a record number of figure information record 304; shaded figure identification information storage unit 408 for storing figure identification information corresponding to the only shaded key figure; shaded code designation information storage unit 409 for storing designation information of the shaded key code of the figure stored in shaded figure identification information storage unit 408; and provisionally-selected figure temporary storage unit 410 for storing identification information of a plurality of figures provisionally selected in the process of character designation.

Text edit area state storage unit 411 comprises cursor position storage unit 412 and text storage unit 413, storing various variables concerning text edit.

Conversion area state storage unit 414 comprises input code temporary storage unit 415 for storing inputted reading for kana-kanji conversion, storing various variables concerning kana-kanji conversion.

Control key area state storage unit 416 stores variable information concerning operations of various control keys.

Image display memory 417 is image display memory corresponding to LCD panel 106. Based on control of LCD control unit 105, images stored here are outputted to LCD panel 106 for display.

Operations of the input device constructed in the above mentioned way can be explained as follows by means of screen examples. In the flowcharts, the parts enclosed by double lines will be explained in detail later. In the following explanation, various system variables are already initialized.

FIG. 7 shows the entire screen layout. The touch panel on the upper surface of the box is divided into the following four areas: text edit area 501 for copying, moving and deleting characters; conversion area 502 for converting designated reading into a character string comprising kanji and kana; character designation area 503 for designating types of characters such as kana, English characters, numerals, and symbols; control key area 504 comprises keys for editing characters in text edit area 501 and for editing and converting characters in conversion area 502.

Conversion area 502 comprises conversion candidate display area 505 for displaying a candidate for the conversion and synonym display area 506 for displaying synonyms: both areas are necessary for kana-kanji conversion in Japanese. Character designation area 503 comprises the following: kana key figures 507 for designating and inputting kana; numeral key figures 508 corresponding to Arabic numerals; English character key figures 509 corresponding to alphabets; and symbol key figures 510 corresponding to a set of symbols. In character designation area 503, kana key figures 507, numeral key figures 508, and English character key figures 509 are arranged within a confine of six centimeters long and four centimeters wide so that the operator can readily drag the pen. The size of each shaded key figure is set to be equal to or more than 12 square mm, which makes it easy for the operator to confirm pen operations.

Text edit operations in text edit area 501 and kana-kanji conversion operations in conversion area 502 using control keys in control key area 504 can be the ones used for conventional word processors. As they are not the focus of the present invention, explanation of them is not given here.

FIG. 8A shows entire operations of the present device. When the operator turns on power, the initial screen shown in FIG. 7 is displayed (Step 601), and the system is ready for input (Step 602). Details of Step 602 is shown in FIG. 8B. Specifically: tablet 108 cyclically and repeatedly senses touch environment (Steps 608–610); the state ready for input is cancelled when the touch environment changes (Step 610); and operation proceeds. Here, the touch environment includes pen pressure ("0" represents no pressure, "1" represents weak pressure, and "2" represents strong pressure) and a touch position (An invalid signal is obtained in the case of "0", and 2-D coordinate information, length of the tablet being Y-axis and its width being X-axis, is obtained in the cases of "1" and "2").

In other words, when the newly sensed touch environment is greatly different from the one already stored or when the elapsed time after the start of Step 602 is longer than a predetermined sample time period $T_0$, the state ready for input is cancelled by an interrupt (Step 608). The pen pressure of the pen and touch position are stored in present touch state storage unit 403 and present touch position storage unit 402, respectively.

In FIG. 8A, when the state ready for input is cancelled, by referring to area layout storage unit 301, the system determines that the value in present touch position storage unit 402 belongs to which of the following areas: text edit area 501; conversion area 502; character designation area 503; and control key area 504 (Step 603).

If the value belongs to control key area 504, it is determined whether End has been pressed (Step 607). If so, text information in text edit area state storage unit 411 is saved into memory card 110, and the power is turned off. If other keys have been pressed, corresponding conversion control or editing processing is carried out (Step 606).

If the value belongs to text edit area 501, it is means that a block of characters is designated for conversion, deletion, and the like. If the value belongs to conversion area 502, it is determined that candidates for the conversion are designated. And editing or conversion control processing is carried out. Such processing can be typical one used for kana-kanji conversion of conventional word processors. As it is not the focus of present invention, explanation of it is not given here.

On the other hand, if the value belongs to character designation area 503, "character designation input" is carried out according to the procedures which will be explained later (Step 604). Designated characters are successively stored in input code temporary storage unit 415 (Step 605).

FIG. 9 shows character designation input (Step 602) in FIG. 8A more in detail.

When the touch position in character designation area 503 is detected, it is determined whether the touch position is included in an area of shaded key display area storage unit 306 of figure information record 304 which corresponds to figure identification information stored in shaded figure identification information storage unit 408. If so, a corresponding record number is stored in present touch figure identification information storage unit 404 as identification information of the touch figure area (Step 701). If that is not the case, for figure information record 304 corresponding to figures other than the one stored in shaded figure identification information storage unit 408, it is determined whether the touch position is included in an area defined by unshaded key display area storage unit 305, and a corresponding record number is stored in present touch figure identification information storage unit 404 as identification information of the touch figure area (Step 701). The touch figure is recognized in the above mentioned way.

If neither of the above is not the case (Step 702), the touch figure is not registered. It is assumed that the pen was dragged outside the defined area. The initial screen is restored (Step 701), and the processing is completed. Next, the system confirms change of the touch state by comparing past touch state storage unit 406 and present touch state storage unit 403 (Step 703), and branches the processing based on the change.

When the touch state changes from "off" to "on", that is, when pressing level changes from "0" to "1" or "2", the value in figure identification information in present touch figure identification information storage unit 404 is copied into shaded figure identification information storage unit 408. And the value in initial shaded key code designation field 313 in figure information record 304 corresponding to the same figure identification information is copied into shaded code designation information storage unit 409 (Step 706). Then, the display area of the figure designated by shaded figure identification information storage unit 408 is set in shaded key display area storage unit 306 in corresponding figure information record 304. Display figure storage unit 303 is referred to in order to find a figure corresponding to the character code in code storage unit 314 designated by shaded code designation information storage unit 409, and the figure is written into a position corresponding to the said area (Step 706). For example, when a figure corresponding to あ is selected, the character figure corresponding to あ which is the leading code designated by shaded code designation information storage unit 409 is selected from the corresponding character codes あ, ぃ, ぅ, and ぇ. あ is displayed at a given position with shading.

After that, a system timer is started. The values in present touch position storage unit 402, present touch state storage unit 403, and present touch figure identification information storage unit 404 are copied into past touch position storage unit 405, past touch state storage unit 406, and past touch figure identification information storage unit 407, respectively. Then processing is completed (Step 707). When the touch state changes to "off" from "on", that is, when pressing level changes from "1" or "2" to "0", it is determined that input of the shaded key is determined. At that time, the code corresponding to the shaded key figure stored in shaded figure identification information storage unit 408 is obtained by referring to shaded code designation information storage unit 409 and stored in input code temporary storage unit 415 (Step 711). After that, the initial screen is restored, and processing is completed.

When the touch state has been "on", it is determined that the pen has been dragged across the touch panel. By comparing values in past touch figure identification information storage unit 407 and present touch figure identification information storage unit 404, it is determined whether the change of touch positions means the change of selected figures (Step 704).

If the values are different, that is, an another touch figure has been selected due to dragging of pen 109, display of the touch figure changes (Step 712). This can be explained more specifically as follows. Display of the figure corresponding to past touch figure identification information storage unit 407 changes: the character code shown by initial shaded key code designation field 313 is displayed in a display area shown by unshaded key display area storage unit 305 in figure information record 304 shown by past touch figure identification information storage unit 407. Display of the figure corresponding to present touch figure identification storage unit 404 changes: the character code shown by initial shaded key code designation field 313 is shaded in a display area shown by shaded key display area storage unit 306 in figure information record 304 shown by present touch figure identification information storage unit 404. Then, the value in present touch figure identification information storage unit 404 is copied into shaded figure identification information storage unit 408, and the value in initial shaded key code designation field 313 is copied into shaded code designation information storage unit 409 (Step 712).

Then, the timer is started. And the values in present touch position storage unit 402, present touch state storage unit 403, and present touch figure identification storage unit 404 are copied into past touch position storage unit 405, past touch state storage unit 406, and past touch figure identification information storage unit 407, respectively. Then, processing is completed (Step 713).

If the values in past touch figure identification information storage unit 407 and present touch figure identification information storage unit 404 are equal, it means that the pen is staying in a specific figure area. Then, the timer value is read, and it is determined whether the value exceeds a given code display time period T (0.5 second) (Step 705).

If the value exceeds T, in the figure stored in shaded figure identification information storage unit 408, code designation information which is designated by shaded code designation information storage unit 409 is cyclically and repeatedly incremented in the corresponding shaded key area, and a code corresponding to a value in the new shaded code designation information storage unit 409 is displayed in a shaded key display area (Step 708). After that, the timer is started, and processing is completed (Step 709). If the codes assigned to the same figure is one, the display does not change.

Figure 10A:
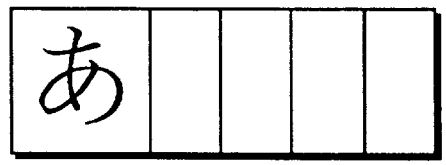
FIGS. 10A to 10C show changes of key display of the input device of the present embodiment when the pen is dragged rightward.
Figure 10B:
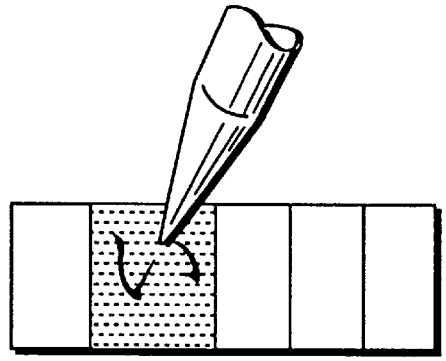
Figure 10C:
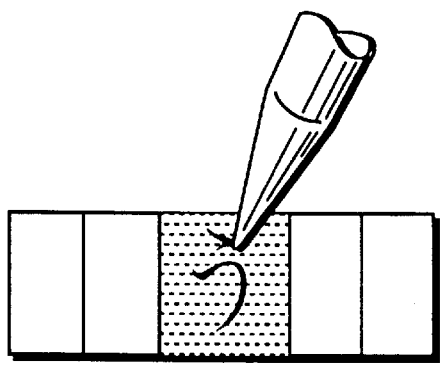
Figure 12A:
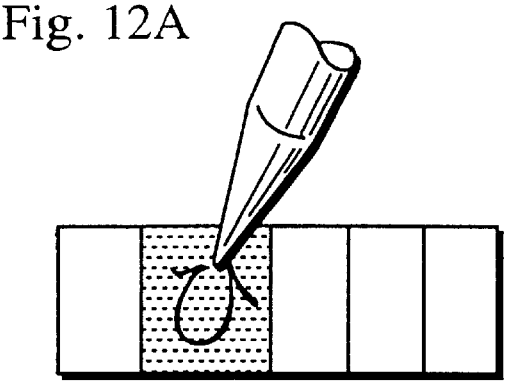
FIGS. 12A to 12G show changes of key display of the input device of the present embodiment when the pen keeps pressing the key.
Figure 12E:
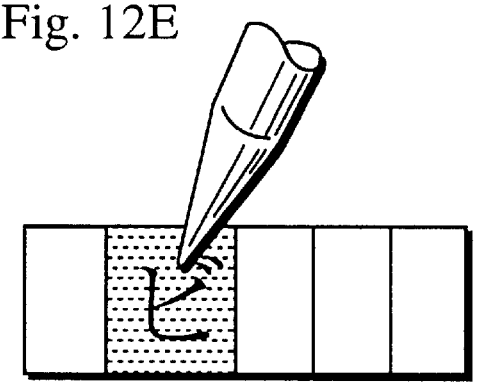
Figure 12B:
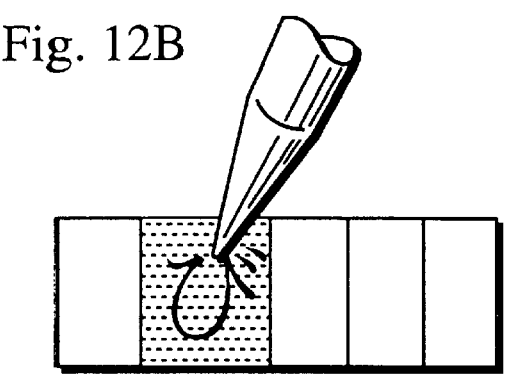
Figure 12F:
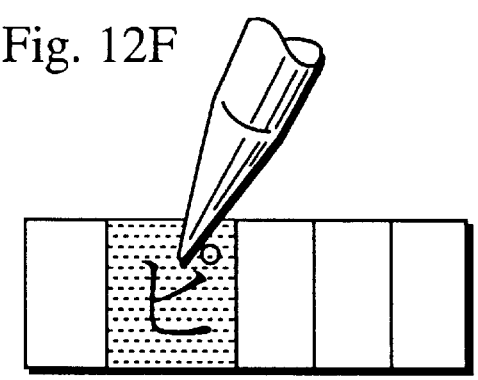
Figure 12C:
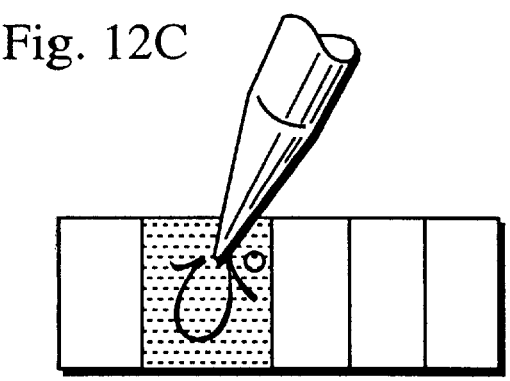
Figure 12G:
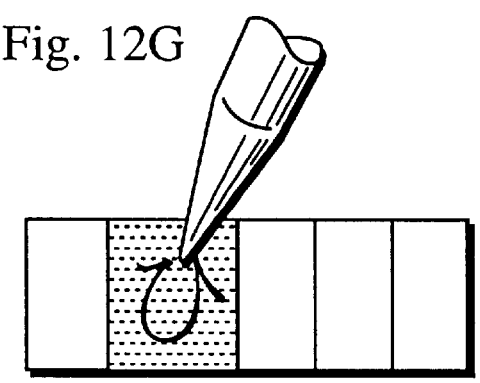
Figure 12D:
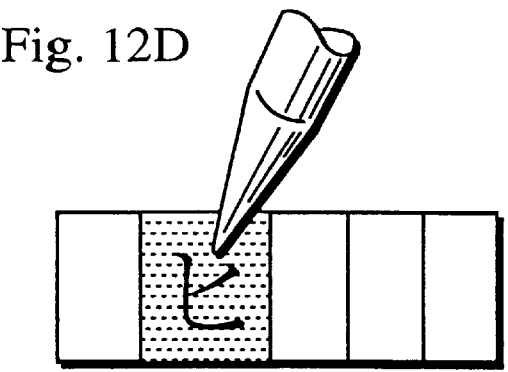

FIGS. 10A to 10C show display examples of character designation area 503 for character input. FIG. 10A shows initial display. Only the key corresponding to あ is visually displayed with a large size as a representative figure of a kana row あ, い, う, え, and お (Japanese kana consists of kana rows, each comprising characters not more than five). As for い to お, only a half of the large key size is displayed with no character in it when those figures are in a state of unshaded key display; the other half is hidden by an adjacent key. More specifically: left half of お is hidden by え; left half of え is hidden by う; left half of う is hidden by い; and left half of い is hidden by あ in the initial screen. After all, in the initial screen, key あ looks as if it is arranged on top of a group of the keys which are half overplayed with each other.

With this state, when pen 109 touches a part corresponding to い, change of the touch state is detected (Step 602), and it is determined that the input is in character designation area 503 (Step 603). And character designation input processing is carried out (Step 604).

Touch figure is the part corresponding to い, and the touch state changes from "off" to "on". Therefore, the figure area, corresponding to the newly touched い changes from unshaded key display area corresponding to unshaded key display area storage unit 305 to shaded key display area corresponding to shaded key display area storage unit 306, and the character code corresponding to い designated by initial shaded key code designation field 313 is shaded. In this way, FIG. 10A changes to FIG. 10B. Shaded い is expanded, as the hidden left half of い appears, hiding right half of あ this time. After all, い looks as if it is arranged on top of the series of keys half overlaid with each other.

Likewise, if the pen is dragged to the right area corresponding to う, change of the touch state is detected again (Step 602). Then, FIG. 10B changes to FIG. 10C.

Display positions and sizes of these characters are determined by the values stored in figure information record 304 shown in FIG. 5. FIG. 11 shows examples of values in figure information record 304, the values corresponding to あ, い, and う. In the case of い, (20, 10) are stored in unshaded key rectangular top left point field 308, (5, 10) in unshaded key rectangular size field 309, (15, 10) in shaded key rectangular top left point field 310, and (10, 10) in shaded key rectangular size field 311. Based on these values, character い is displayed as shown in FIG. 10B. It is also possible to expand the shaded key upward by changing the values in shaded key rectangular top left point field 310 and shaded key rectangular size field 311.

The next explanation is about operational procedures of character designation and changes of display when a single figure represents varieties of the same character. For example, ひ in Japanese has five varieties, such as び, ぴ, ひ゛, ひ゜, and ぴ. FIGS. 12A to 12G show change of display.

When the pen touches the screen, ひ which corresponds to the initial shaded key code designated by initial shaded key code designation field 313 becomes shaded. When the elapsed time after the start of Step 602 is longer than a predetermined sample time period $T_0$, interrupt processing is generated. By fixing pen 109 at this state (Step 602), interrupt processing is generated based on the elapsed time after the start of Step 602 (Step 608).

Next, it is determined that the input is in character designation area (Step 603), and character designation processing starts (Step 604). Touch state has been "on" (Step 703). Touch figure has not changed (Step 704). And elapsed time is measured (Step 705).

If the elapsed time is longer than 0.5 second of the code display time period, shaded key code designation information stored in shaded code designation information storage unit 409 is incremented cyclically and repeatedly. Then, the first shaded key code ひ changes to the second shaded key code び, Therefore, FIG. 12A changes to FIG. 12B.

By continually applying pressure onto the screen, the shaded key code ひ changes to び, ぴ, ひ゛, ひ゜ and back to original ひ, successively. Therefore, the display changes from FIGS. 12C to 12G. Input of numerals by numeral key figures 508 and English characters by English character key figures 509 are carried out in the same way.

The following explanation is the case of inputting English characters.

FIGS. 13A to 13J are equivalent to FIGS. 10A to 10C and FIGS. 12A to 12G, showing that the same pen operations as the case of Japanese character input are applied to English character key FIGS. 509.

Figure 13A:
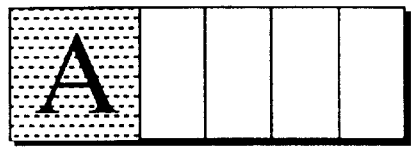
FIGS. 13A to 13J are equivalent to FIGS. 10A to 10C and FIGS. 12A to 12G, showing that the same pen operations as the case of Japanese character input are applied to English character key figures of the input device of the present invention.
Figure 13B:
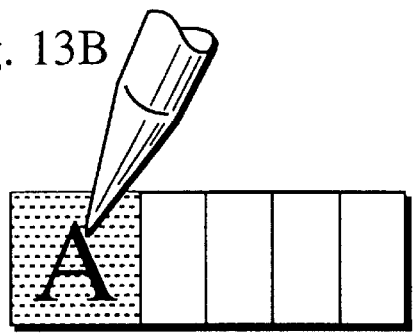
Figure 13C:
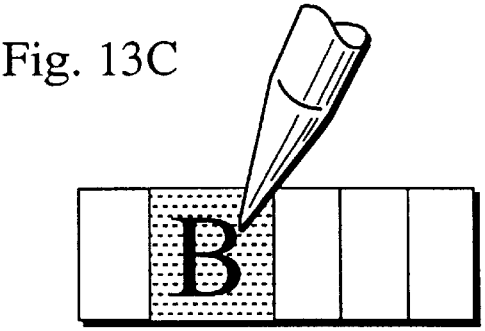
Figure 13D:
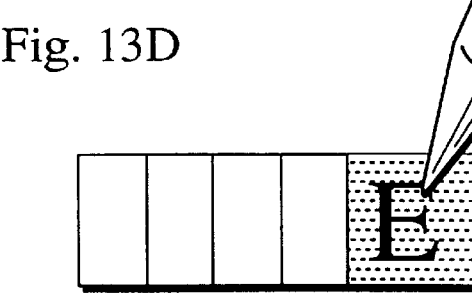
Figure 13E:
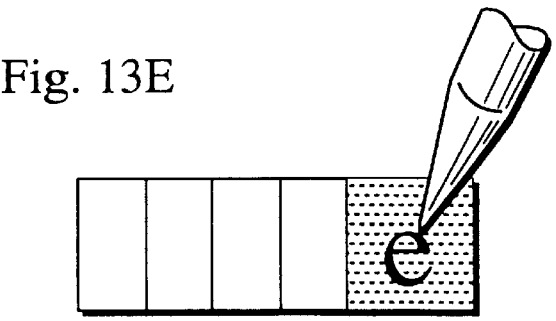
Figure 13F:
Figure 13G:
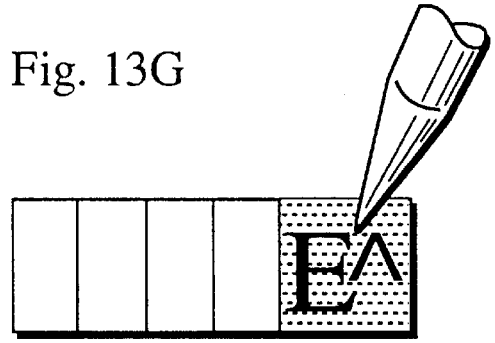
Figure 13H:
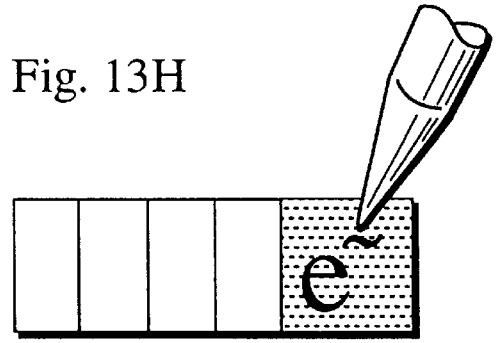
Figure 13I:
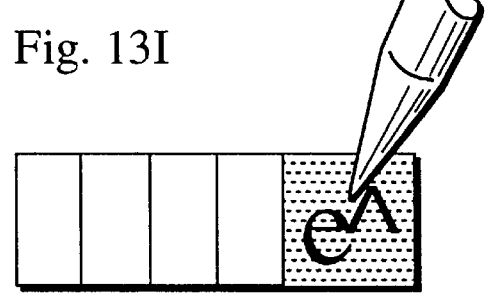
Figure 13J:
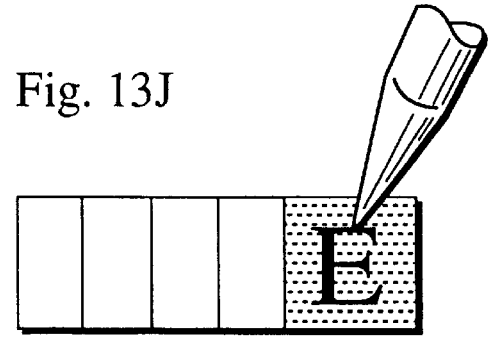

In the initial stage, only "A" is displayed as a representative of the five letters from "A" to "E" (FIG. 13A). By touching the key A with a pen, A is shaded (FIG. 13B). By dragging pen 109 rightward across tablet 108, key B of the large size is shaded (FIG. 13C). After dragging pen 109 to key E (FIG. 13D) and fixing it there, display of key E changes to e (FIG. 13E), E˜ (FIG. 13F), Ê (FIG. 13G), ẽ (FIG. 13H), ê (FIG. 13I), and to back original E, successively. If pen 109 is lifted up from tablet 108 when e is displayed, input of the shaded key code e is determined.

According to the present invention, by setting unshaded key display area smaller than displayed shaded key figure, it is possible to reduce the entire area for the keyboards which are displayed simultaneously. As a distance moved by the pen is little, it is possible to reduce the operator's inconvenience.

According to the present invention, key display is changed by dragging the pen across the tablet, and the desired key input is determined by lifting it up from the tablet. Therefore, it is possible to determine key input more correctly than to determine key input by touching the tablet with the pen.

According to the present invention, by setting the unshaded key display area smaller than displayed shaded key figure, it is possible to reduce the entire area of the keyboards which are displayed simultaneously. And as input is determined by lifting up a pen from the tablet, correct character designation is possible even if the keys are small. Therefore, it is possible to arrange many keys on a small screen.

According to the present invention, it is possible to arrange kana keys and QWERTY keys on the same screen. Therefore, frequent switching of keyboards is not necessary.

According to the present invention, by setting an unshaded key display area rightward of a shaded key display area in the initial screen, it is possible to follow natural hand-writing movement in Japanese and English, which goes from left to right. Therefore, the operator does not have to feel so much strain on the hand.

According to the present invention, it is possible to change character attributes by pressing the pen against the tablet while the display changes at every given time. Character input is determined by lifting the pen up from the tablet when the desired character is displayed on the screen, character input is determined. Therefore, the operator does not have to move the pen frequently for changing attributes.

According to the present invention, part of each key is overlaid with each other. Therefore, as key display does not change so much when the pen is dragged, the operator does not have to suffer from terrible eye strain.

In order to detect pressure on the screen, change of contact resistance values on flat resistance member of tablet 108 is used. But other methods can also be used. For example, it is possible to obtain a signal from a pressure sensor on the tip of pen 109. In order to detect a touch position, it is also possible to use changes of capacitance instead.

Embodiment 2

The input device of the second embodiment of the present invention can be explained as follows. This input device is used in input unit of the portable information processing device shown in FIG. 1 as well as the input device of the first embodiment. As the construction and layout of the storage areas are the same as the ones in FIGS. 3, 4, and 5, explanation of them is not given here.

Figure 14:
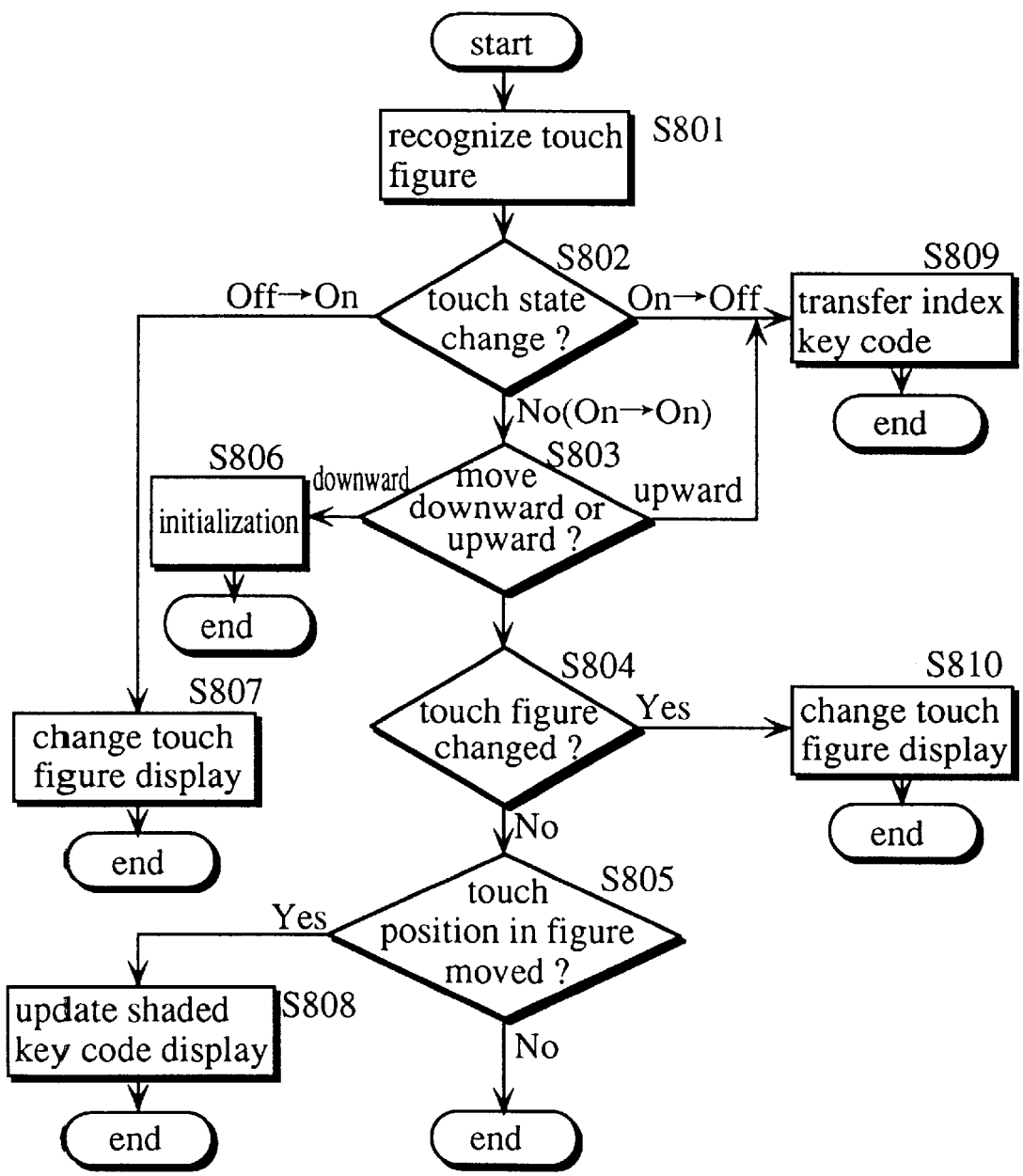
FIG. 14 is a flowchart showing processing of the input device of the second embodiment of the present invention.

FIG. 14 is a flowchart showing operations of the present device.

When the touch position in character designation area 503 is detected, it is determined whether the touch position is included in shaded key display area storage unit 306 of figure information record 304 corresponding to the figure identification information stored in shaded figure identification information storage unit 408. If so, the corresponding record number is stored in present touch figure identification information storage unit 404 as identification information of the touch figure area (Step 801). If that is not the case, for figure information record 304 corresponding to figures which are not stored in shaded figure identification information storage unit 408, it is determined whether the touch position is included in an area defined by unshaded key display area storage unit 305, and the corresponding record number is stored in present touch figure identification information storage unit 404 as identification information of the touch figure area (Step 801). The touch figure is recognized in the above mentioned way.

Next, by comparing values in past touch state storage unit 406 and present touch state storage unit 403, a change of touch state is confirmed, and processing branches based on the change (Step 802).

When the touch state changes from "off" to "on", that is, when pressing level changes from "0" to "1" or "2", the value in figure identification information in present touch figure identification information storage unit 404 is copied into shaded figure identification information storage unit 408, and the value of initial shaded key code designation field 313 in figure information record 304 corresponding to the same figure identification information is copied into shaded code designation information storage unit 409 (Step 807). Then, the display area of the figure designated by shaded figure identification information storage unit 408 is set in shaded key display area storage unit 306 of the corresponding figure information record 304, display figure storage unit 303 is referred to in order to detect the figure corresponding to the character code in code storage unit 314 designated by shaded code designation information storage unit 409, and the figure is written into the position corresponding to the display area of the figure designated by shaded figure identification information storage unit 408.

Then, the values in present touch position storage unit 402, present touch state storage unit 403, and present touch figure identification information storage unit 404 are copied into past touch position storage unit 405, past touch state storage unit 406, and past touch figure identification information storage unit 407, respectively. Then, processing is completed (Step 807).

When the touch state changes from "on" to "off", that is, when the pressing level changes from "1" or "2" to "0", it is judged that input of the shaded key is determined. At this time, the character code corresponding to the shaded figure stored in shaded figure identification information unit 408 is obtained by referring to shaded code designation information storage unit 409, and it is stored in input code temporary storage unit 415 (Step 809). Then the initial screen is restored, and processing is completed.

If the touch state has been "on", it is determined in which direction was the pen dragged (Step 803). Specifically, it is determined whether the pen has been dragged greatly along Y-axis by determining whether a y value on the Y-axis of the touch position of present touch position storage unit 402 is within the display area stored in unshaded key display area storage unit 305 and shaded key display area storage unit 306 of figure information record 304 corresponding to the figure identification information stored in shaded figure identification information storage unit 408 (Step 803).

If the touch position is placed upward the area of the figure stored in shaded figure identification information storage unit 408, it is assumed that the figure in shaded figure identification information storage unit 408 is selected. At this time, the code corresponding to the shaded key figure stored in shaded figure identification information storage unit 408 is obtained by referring to shaded code designation information storage unit 409, and it is stored in input code temporary storage unit 415 (Step 809).

If the touch position is placed downward the area of the figure stored in shaded figure identification information storage unit 408, it is assumed that a selection operation has been cancelled. The initial screen is restored, and processing is completed (Step 806).

If neither of the above is not the case, by comparing values in past touch figure identification information storage unit 407 and present touch figure identification storage unit 404, it is determined that whether the change of the touch position indicates change of selected figure (Step 804).

If the values are different, that is, another touch figure has been selected due to dragging of pen 109, display of the touch figure changes (Step 810), and processing is completed. More specifically, the same processing as Step 712 is carried out, and then processing is completed.

If the values are equal, by comparing values in past touch position storage unit 405 and present touch position storage unit 402, it is determined whether the pen has been dragged a little on the selected key (Step 805). If there was such a little dragging of the pen, the coordinate values of the pen before and after dragging are obtained. Difference between x values is obtained, and difference between y values is also obtained. They are compared. If the bigger one is equal to or exceeds 30% of the width of the shaded key, it is assumed that the operator apparently designated the display of the next character candidate. Therefore, for the selected figure stored in shaded figure identification information storage unit 408, the value in shaded code designation information storage unit 409 is cyclically and repeatedly incremented, and the figure corresponding to the next character code is displayed on the screen. Then processing is completed (Step 808).

The following explanation is how key displays change in the above mentioned operations.

FIGS. 15A to 15D show how display changes in order to input "b". The arrows represent a little dragging of pen 109.

Figure 15A:
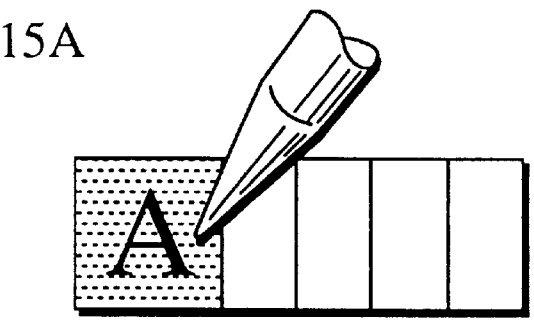
FIGS. 15A to 15D show changes of key display of the input device of the present embodiment in order to input a character "b"
Figure 15B:
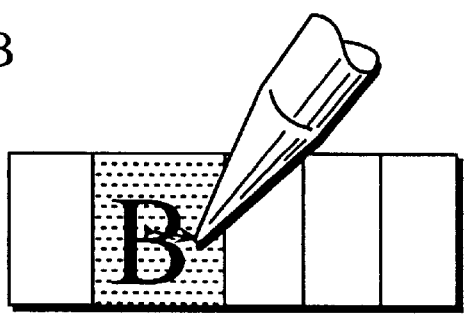

FIGS. 15A and 15B show that the same pen operation as the one in FIGS. 13B and 13C has been carried out.

Figure 15C:
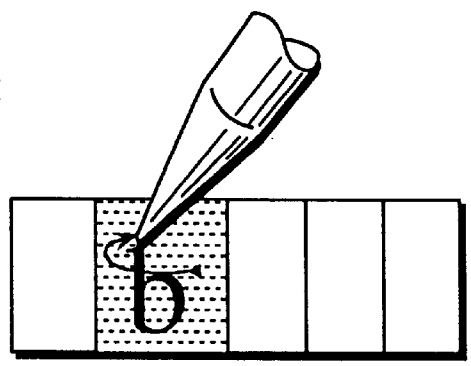

FIG. 15C shows that pen 109 has been dragged a little on B. The key display changed from B to b (Step 808) due to this dragging.

Figure 15D:
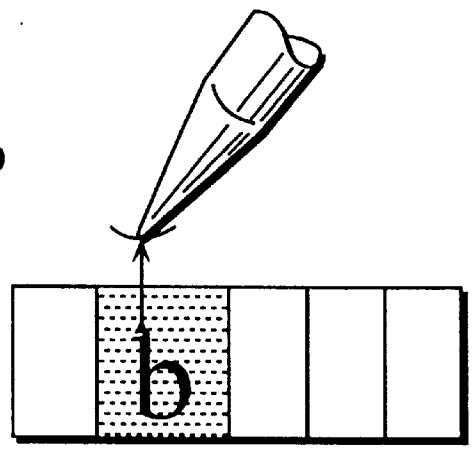

FIG. 15D shows that pen 109 has been dragged upward b. By this dragging, input of b is determined (Step 809).

According to the present invention, by dragging the pen across a row of characters, the key display successively changes to display another character in the same row. And by dragging the pen to a given direction on the selected figure, it is possible to determine input of the character. Therefore, the operator does not have to repeat vertical movement of the pen over the manuscript over and over again to determine input of a character, which was necessary for conventional devices. The operator can determine input by only a little dragging of the pen.

According to the present invention, by dragging the pen only a little on the selected figure, the display of the candidate for the character/figure successively changes. Therefore, the candidate can be obtained at a desired timing, which is helpful in effective character input. And the operator can readily input keys, without confirming the keyboard and moving the pen over and over again.

In the present embodiment, it is determined whether there was a little dragging of the pen on the selected key by the difference between the x values or the y values of the pen positions within a given time period. However, other methods can be used. It is also possible to determine that there was a little dragging of the pen on the selected key only when the pen repeats a little-dragging-action and the screen pressure changes.

Embodiment 3

The input device of the third embodiment of the present invention can be explained as follows. This input device is used in an input unit of the portable information processing device shown in FIG. 1 as well as the input devices of the first and the second embodiments. As the construction and layout of the storage areas are the same as the ones in FIGS. 3, 4, and 5, explanation of them is not given here.

Figure 16:
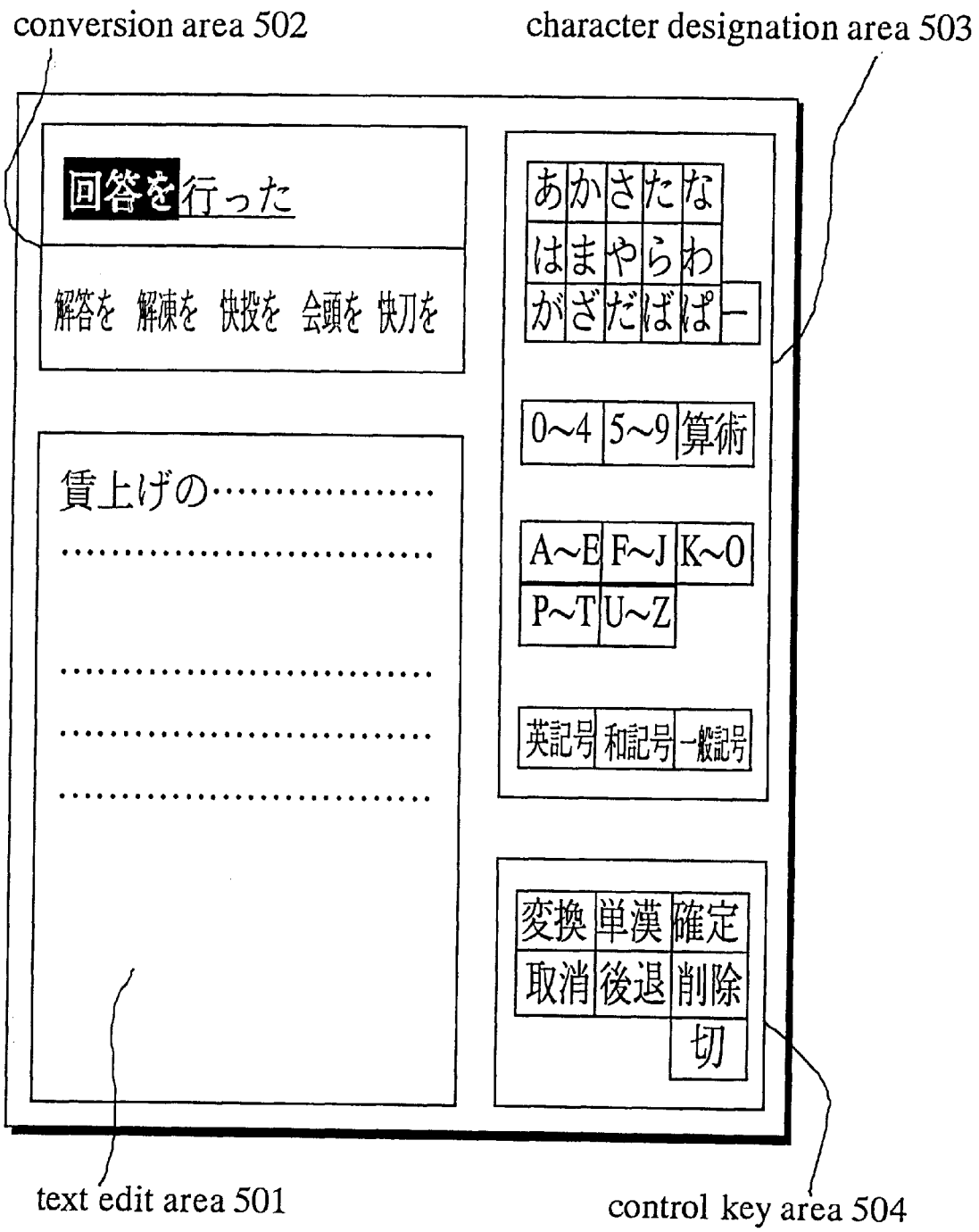
FIG. 16 shows a screen layout of the input device of the third embodiment of the present invention.

FIG. 16 shows a screen layout of the third embodiment. In character designation area 503, only the representative character of each kana row are arranged. Here is an example of kana row あ, い, う, え, and お. On behalf of this row, the leading character r is arranged at the most left top side. Several numeral keys are grouped and displayed as 0–4. The same thing can be said to English characters.

FIG. 17 shows a part of the contents in figure layout storage unit 302 in the third embodiment. In unshaded key rectangular top left point field 308, values of each characters are registered. In unshaded key rectangular size field 309, values are registered for only the representative character. For each of the subordinate characters, (0, 0) is registered. In this figure, kana row か is taken up as an example: か is the representative key. き and く are subordinate keys.

Figure 18:
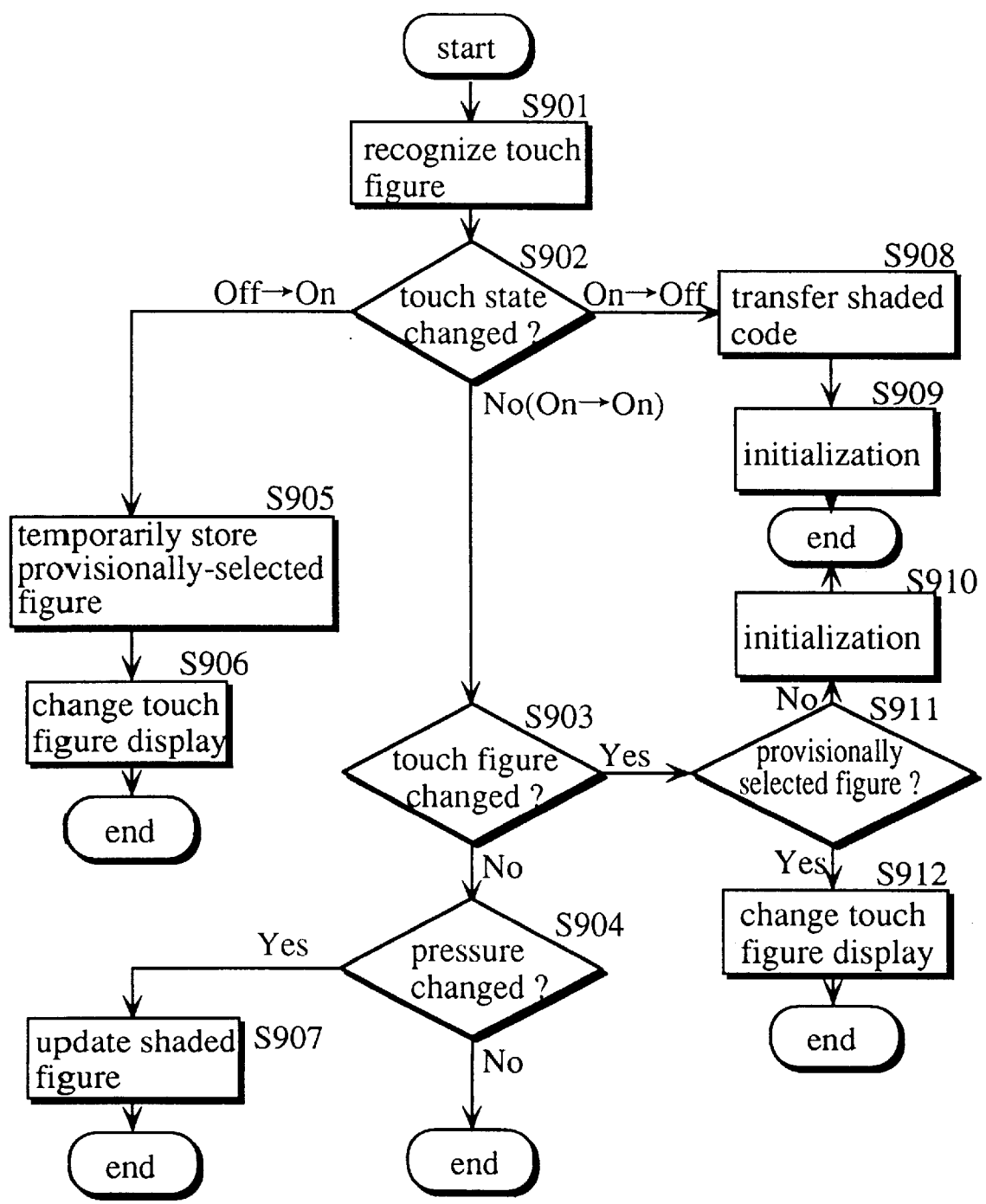
FIG. 18 is a flowchart explaining operations of the input device of the present embodiment.

The third embodiment differs from the first embodiment in character designation area 503 and operations therein. This difference can be explained as follows by means of the flowchart in FIG. 18.

First, the touch figure is recognized as well as it was recognized in the first embodiment (Step 901). In this embodiment, the provisionally selected figure in provisionally-selected figure temporary storage unit 410 is recognized first. This is different from the first embodiment. Specifically, it is determined whether the touch figure is the same as the provisionally selected figure stored in provisionally-selected figure temporary storage unit 410. If so, the provisionally selected figure is recognized as the touch figure firstly, and only if that is not the case, an another figure is recognized as the touch figure.

Next, by comparing the values in past touch state storage unit 406 and present touch state storage unit 403, a change of touch state is confirmed, and processing branches (Step 902).

When the touch state changes from "off" to "on", that is, when pressing level of the key of the representative character of each kana row changes from "0" to "1" or "2", the selected representative character key and its subordinate keys are registered in provisionally-selected figure temporary storage unit 410 (Step 905). For the figure stored in provisionally-selected figure temporary storage unit 410, the display area changes to shaded key display area stored in shaded key display area storage unit 306, figure identification information of the figure corresponding to the representative character key is stored in shaded figure identification information storage unit 408, and the area designated by shaded key display area storage unit 306 is shaded (Step 906). For example, when か is selected, き, く, け and こ are stored as subordinate keys. In provisionally-selected figure temporary storage unit 410, figure identification information of these characters are stored. When all the above mentioned processing is completed, the values in present touch position storage unit 402, present touch state storage unit 403, and present touch figure identification information storage unit 404 are copied to past touch position storage unit 405, past touch state storage unit 406, and past touch figure identification information storage unit 407, respectively. Then, processing is completed (Step 906).

When the touch state changes from "on" to "off", that is, when pressing level changes from "1" or "2" to "0", it is judged that input of the shaded key is determined. At this time, the figure identification information stored in shaded figure identification information storage unit 408 is obtained, the corresponding character code is also obtained by referring to shaded code designation information storage unit 409, and they are stored in input code temporary storage unit 415 (Step 908). After that, the initial screen is restored, and processing is completed (Step 909).

When the touch state is "on" and has not changed, by comparing the values in past touch figure identification information storage unit 407 and present touch figure identification information storage unit 404, it is determined whether the selected figure has changed (Step 903).

If the values are different, it is determined whether the value in present touch figure identification information storage unit 404 is stored in provisionally-selected figure temporary storage unit 410 (Step 911). If it is not stored, the initial screen is restored, and processing is completed (Step 910). If it is stored, shaded key display of the character code, the character code being designated by initial shaded key code designation field 313 in the unshaded key display area stored in unshaded key display area storage unit 305 in figure information record 304 corresponding to shaded figure identification information storage unit 408, changes to unshaded key display. Then, in the shaded key display area stored in shaded key display area storage unit 306 in figure information record 304 corresponding to figure identification information stored in present touch figure identification information storage unit 404, the code in initial shaded key code designation field 313 is shaded (Step 912). After that, the values in present touch position storage unit 402, present touch state storage unit 403, and present touch figure identification information storage unit 404 are copied into past touch position storage unit 405, past touch state storage unit 406, and past touch figure identification information storage unit 407, respectively. Then, processing is completed (Step 912).

If the touch figure has not changed, by comparing the values in past touch state storage unit 406 and present touch state storage unit 403, it is determined whether the pressure of the pen has changed on the selected key (Step 904).

If past touch state storage unit 406 stores "1" showing weak pressure and present touch state storage unit 403 stores "2" showing strong pressure, it is assumed that the operator has changed pen pressure intentionally, designating the candidate to be displayed next. In the selected figure stored in shaded figure identification information storage unit 408, the value in shaded code designation information storage unit 409 is incremented cyclically and repeatedly, and the next character code is displayed on the screen. Then, processing is completed (Step 907).

Figure 19A:
FIGS. 19A to 19B show changes of key display of the input device of the present embodiment.
Figure 19B:
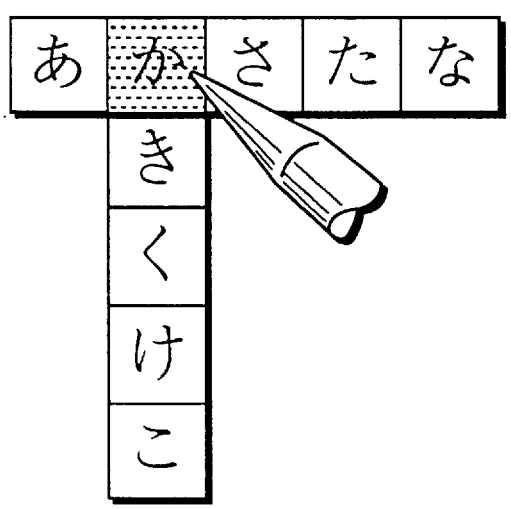
Figure 19C:
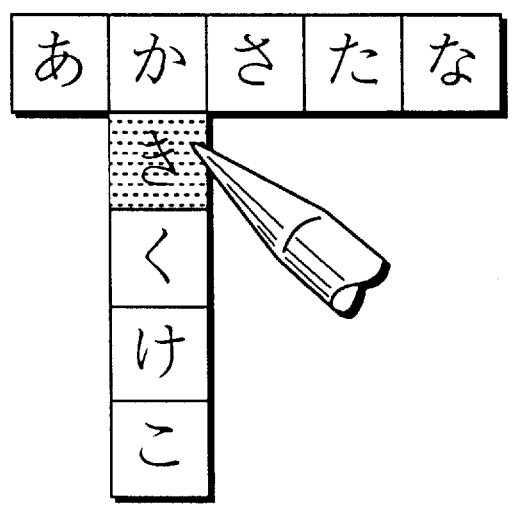
Figure 19D:
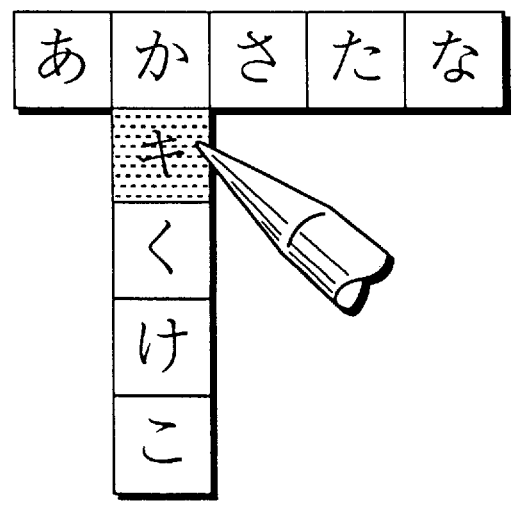

FIGS. 19A to 19D show how key displays change in character designation area 503 when a character is inputted. FIG. 19A shows initial screen display. When the pen touches key か, which is a representative key of a kana row か, き, く, け, and こ, か becomes shaded as shown in FIG. 19B, and subordinate keys き, く, け, and こ appear downward か. When the operator drags the pen without changing the pen pressure, き becomes shaded as shown in FIG. 19C. If the operator changes only pen pressure at this position, き changes to ぎ as shown in FIG. 19D, which has been stored as the next candidate.

The following explanation is about inputting English characters.

Figure 20A:
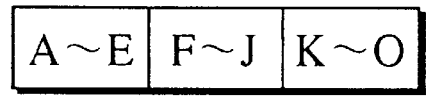
FIGS. 20A to 20D show how key displays of English characters change when the pen operations shown in FIGS. 19A to 19D are applied to an English character key.
Figure 20B:
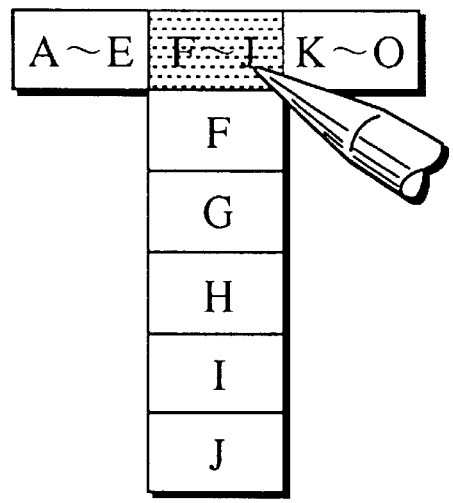
Figure 20C:
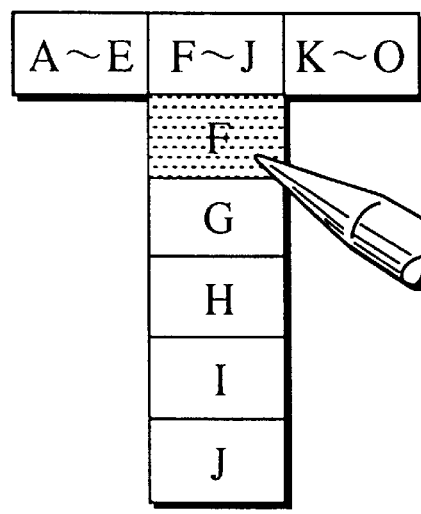
Figure 20D:
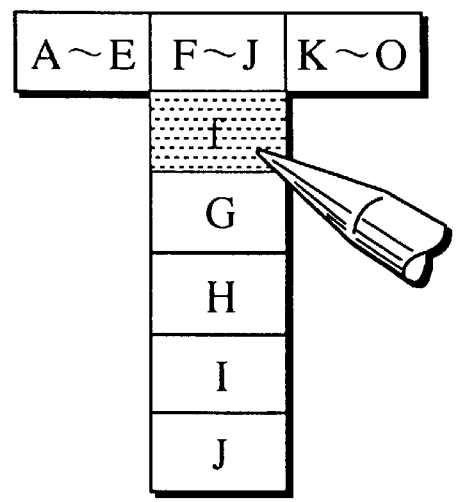

FIGS. 20A to 20D show how key displays of English characters change when the pen operations shown in FIGS. 19A to 19D are applied to English character key FIGS. 509. FIG. 20A shows initial screen display. FIG. 20B shows that pen 109 has touched F–J. FIG. 20C shows pen 109 has been dragged downward. FIG. 20D shows pen pressure has changed. By lifting up pen 109 from tablet 108, f is inputted.

According to the present device, by changing pen pressure intentionally, the display of the candidate for the character/figure successively changes. Therefore, it is possible to determine the input when the desired character appears, which is helpful in effective character input. And the operator can readily input keys, without confirming the keyboard and moving the pen over and over again.

According to the present device, only representative keys of each character group are displayed on the initial screen, while each of their subordinates keys are hidden and appear only when their representative key is touched by the pen. Therefore, entire area for keyboards that have to be displayed simultaneously can be reduced. The pen is dragged only a little on the screen, which is helpful in efficient key input.

According to the present invention, by dragging the pen across a series of subordinate keys on the tablet from up to bottom, which is similar to natural hand-writing movement especially in Japanese, key input is possible with a little strain on the operator's hand.

It will be appreciated that modifications may be made in our invention. For example, (1) Instead of ROM area in main memory 103, the program including processing procedure shown in the flowcharts can also be stored in magnet cards or IC cards of the present device.

(2) Usage of the input device of the present invention is not limited to a portable information processing device, which is used in creating documents. Also, one key does not necessary have to represent only one character, numeral or symbol. One key can represent an item of information.

Figure 21:
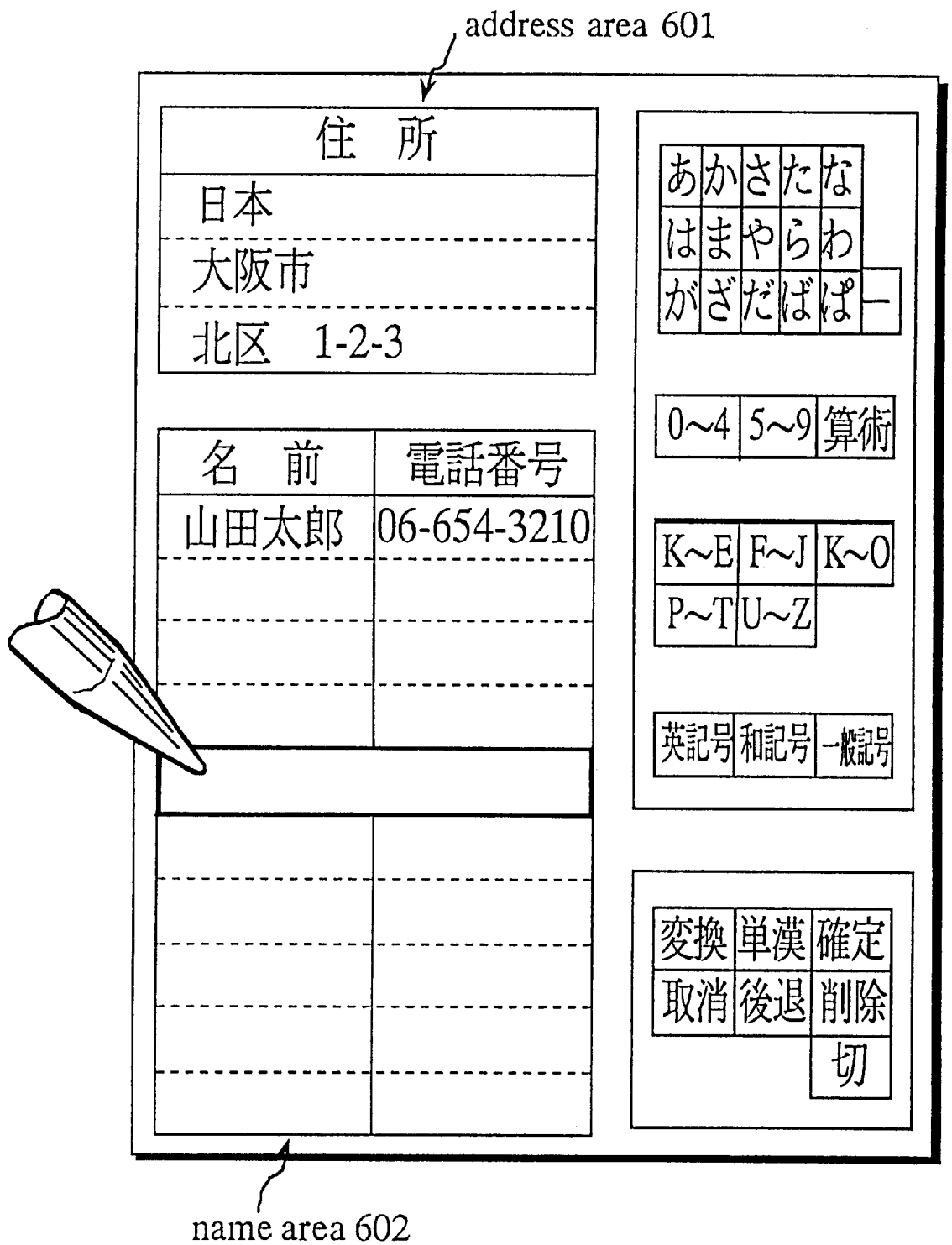
FIG. 21 shows a screen layout when the portable information processing device is used as a directory.

FIG. 21 shows a screen layout when the portable information processing device is used as a directory. In this figure, the pen touches a key in name area 602, the key comprising a name and a telephone number. Then, the address corresponding to the name and telephone number appears in address area 601.

What is claimed is:

1. An input device for a portable information processing device that uses a touch screen, the input device comprising:

a pen;

a screen;

a transparent tablet, which extends across the screen, detects whether the pen is on the tablet and a position of the pen if it is on the tablet, and outputs a signal showing whether the pen is on the tablet and the position of the pen if it is on the tablet;

initial display means for displaying keys on the screen which each correspond to a single item;

display change means for detecting a latest position of the pen by reading the signal from the tablet when the tablet detects the presence of the pen, determining the key corresponding to the latest position as a provisionally selected key, and changing a part of the keys displayed by the initial display means without changing the single item corresponding to each key;

key change means for changing, on detecting that a pen operation has been carried out on the provisionally selected key after the pen touches the tablet, a single item corresponding to the provisionally selected key to a single item corresponding to another key which is related to the provisionally selected key, and for changing a display of the keys so that the other key corresponding to the changed single item is displayed on the screen; and input determination means for determining, on detecting that the pen is lifted up from the tablet, the single item corresponding to the provisionally selected key displayed at a position on the tablet from which the pen has been lifted as an input key.

2. The input device of claim 1, wherein the initial display means displays predetermined keys larger than other keys, and the display change means expands the provisionally selected key.

3. The input device of claim 2, wherein the display change means expands the provisionally selected key at least one of leftward and upward.

4. The input device of claim 3, wherein the initial display means overlays adjacent keys partially, and the display change means displays the provisionally selected key on top of the overlaid keys.

5. The input device of claim 1, wherein
all of the keys are divided into at least one group of related keys, with the initial display means displaying only a representative key for each group of related keys, and
the key change means successively changes the display of the provisionally selected key to another key which is related to the provisionally selected key at every given time when the pen continues pressing the provisionally selected key, wherein the other key is sequentially and cyclically selected from all keys in a group which includes the provisionally selected key.

6. The input device of claim 1, wherein
all of the keys are divided into at least one group of related keys, with the initial display means displaying only a representative key for each group of related keys, and
the key change means changes the display of the provisionally selected key to another key which is related to the provisionally selected key when the pen continues pressing the provisionally selected key and a distance moved by the pen on the provisionally selected key is greater than a predetermined value, wherein the other key is sequentially and cyclically selected from all keys in a group which includes the provisionally selected key.

7. The input device of claim 1, wherein
all of the keys are divided into at least one group of related keys, with the initial display means displaying only a representative key for each group of related keys, and
the key change means changes the display of the provisionally selected key to another key which is related to the provisionally selected key when the pen continues pressing the provisionally selected key and a distance moved by the pen within a given time period on the provisionally selected key is greater than a predetermined value, wherein the other key is sequentially and cyclically selected from all keys in a group which includes the provisionally selected key.

8. The input device of claim 1, wherein
all of the keys are divided into at least one group of related keys, with the initial display means displaying only a representative key for each group of related keys, and
the tablet detects pen pressure, and
the key change means changes the display of the provisionally selected key to another key which is related to the provisionally selected key when the pen continues pressing the provisionally selected key and a change in pen pressure is greater than a given value, wherein the other key is sequentially and cyclically selected from all keys in a group which includes the provisionally selected key.

9. The input device of claim 1, wherein
all of the keys are divided into at least one group of related keys, with the initial display means displaying only a representative key for each group of related keys, and
the tablet detects pen pressure, and
the key change means changes the display of the provisionally selected key to another key which is related to the provisionally selected key when the pen continues pressing the provisionally selected key and a change in pen pressure within a given time period is greater than a given value, wherein the other key is sequentially and cyclically selected from all keys in a group which includes the provisionally selected key.

10. The input device of claim 1, wherein
all of the keys are divided into at least one group of related keys, with the initial display means displaying only a representative key for each group of related keys, and
the display change means changes the keys so that a row of other keys which have been related to the provisionally selected key is adjacent to the provisionally selected key, the row of other keys being composed of all keys in a group which includes the provisionally selected key.

11. The input device of claim 1, wherein the input determination means includes a drag unit for determining, on detecting that the pen has been dragged outside a key, a single item corresponding to the key as an input item before the input determination means determines the single item corresponding to the provisionally selected key displayed at the position on the tablet from which the pen has been lifted up as the input item.

12. The input device of claim 11, wherein the drag unit means determines a key as the input key on detecting that the pen has been dragged outside the key in a given direction.

13. An input device for a portable information processing device that uses a touch screen, the input device comprising:
a pen;
a screen;
a transparent tablet extending across the screen to detect whether the pen is on the tablet and a position of the pen if it is on the tablet, and outputs a signal showing whether the pen is on the tablet and the position of the pen if it is on the tablet;
initial display means for displaying a plurality of keys on the screen, each key is representative of a particular indicia, a predetermined number of the plurality of keys are arranged on the screen as a group of related keys, with the initial display means displaying only a representative key of the group of related keys;
display change means for detecting a latest position of the pen by reading the signal from the tablet when the tablet detects the presence of the pen, determining the key corresponding to the latest position as a provisionally selected key, and changing a part of the keys displayed by the initial display means, the display change means changes the display of the provisionally selected key to another key which is related to the provisionally selected key when the pen continues pressing the provisionally selected key after a predetermined time period; and
input determination means for detecting whether a pen operation to determine input has been carried out after the pen touches the tablet, and if so, determining a key related to the pen operation as an input key, when a distance moved by the pen on the tablet is greater than a predetermined value.

14. The input device of claim 13, wherein the indicia is a character symbol.

15. An input device for a portable information processing device that uses a touch screen, the input device comprising:
a pen;
a screen;
a transparent tablet which is extends across the screen, the tablet detects whether the pen is on the tablet and a position of the pen if it is on the tablet, and outputs a signal showing whether the pen is on the tablet and the position of the pen if it is on the tablet;
initial display means for displaying keys on the screen which each correspond to a single item;
display change means for detecting a latest position of the pen by reading the signal from the tablet when the tablet detects the presence of the pen, determining the key corresponding to the latest position as a provisionally selected key, changing a part of the keys displayed by the initial display means, and changing the provisionally selected key to another key corresponding to a latest position of the pen and fuither changing a display of a part of the keys when the pen has been dragged on the tablet; and input determination means for determining, on detecting that the pen is lifted up from the tablet, a single item corresponding to the provisionally selected key displayed at a position on the tablet from which the pen has been lifted up as an input item.

16. A portable information processing device having an input device, comprising:

a touch screen for displaying a plurality of characters in a predetermined group adjacent to each other in a first dimensional size, at a first coordinate position on the screen;

an indicator for selecting one of the plurality of characters, by contacting the first coordinate position;

means for identifying the character selected by the indicator;

means for automatically enlarging the selected character to a second dimensional size larger than the first dimensional size at the first coordinate position on the screen to increase its visibility on the screen;

means for inputting the selected character into storage;

a timer unit for counting a time period that the indicator has remained at the first coordinate position; and means for comparing the time period to a predetermined time period and if the predetermined time period is exceeded, a subsequent character in the predetermined character group is automatically enlarged on the screen at the first coordinate position.

17. The invention of claim 16, wherein the means for automatically enlarging the selected character causes the selected character to overlay one or more adjacent characters of the predetermined group at the first coordinate position on the screen.

18. The invention of claim 16, wherein the means for inputting the character into storage includes removing the indicator from contact with the screen at the first coordinate position.

19. The invention of claim 16, wherein the means for inputting the character into storage includes a contact movement of the indicator across the screen from an initial contact with the selected character currently displayed at the first coordinate position.

20. A portable information processing device having an input device, comprising:

a touch screen for displaying a representation of a plurality of characters as a predetermined group at a first coordinate position on the screen;

an indicator for selecting the representation of the plurality of characters, by contacting the first coordinate position;

means for automatically displaying the plurality of characters in an expanded sequence extending from the first coordinate position across other coordinate positions corresponding, respectively, to one of each of the plurality of characters;

means for automatically changing any of the plurality of characters by contacting the corresponding coordinate position for a predetermined time period; and means for inputting a selected character by moving the indicator from the coordinate position across adjacent coordinate positions in a predetermined direction.

21. A key input method for a portable information processing device comprising a pen, a screen and a tablet, the input method including the steps of:

displaying keys on the screen, each key corresponds to a different single item;

detecting a key corresponding to a latest position of the pen by reading a signal from the tablet when the tablet detects presence of the pen, determining the key corresponding to the latest position as a provisionally selected key, and changing a part of the keys displayed by the initial display means without changing the respective single item corresponding to each key;

changing, on detecting that a pen operation has been carried out on the provisionally selected key after the pen touches the tablet, a single item corresponding to the provisionally selected key to a single item corresponding to another key which is related to the provisionally selected key, and for changing a display of the keys so that the other key corresponding to the changed single item is displayed on the screen; and determining, on detecting that the pen is lifted up from the tablet, the single item corresponding to the provisionally selected key displayed at a position on the tablet from which the pen has been lifted as an input key.

22. A medium for a portable information processing device comprising a pen, a screen and a tablet, the medium storing a program for the steps of:

displaying keys on the screen, each key corresponds to a different single item;

detecting a key corresponding to a latest position of the pen by reading a signal from the tablet when the tablet detects the presence of the pen, determining the key corresponding to the latest position as a provisionally selected key, and changing a part of the keys displayed by the initial display means without changing the respective signal corresponding to each key;

changing, on detecting that a pen operation has been carried out on the provisionally selected key after the pen touches the tablet, a single item corresponding to the provisionally selected key to a single item corresponding to another key which is related to the provisionally selected key, and for changing a display of the keys so that the other key corresponding to the changed single item is displayed on the screen; and determining, on detecting that the pen is lifted up from the tablet, the single item corresponding to the provisionally selected key displayed at a position on the tablet from which the pen has been lifted as an input key.

23. A portable information processing device having an input device, comprising:

a touch screen for displaying a keyboard of alphabetic characters having an upper and lower case representation, the touch screen detects physical contact to provide an output signal representative of the point of contact;

means for storing the alphabetic characters;

means for driving the touch screen to display the alphabetic characters;

display change means for detecting a point of contact of the touch screen to identify a specific alphabetic character and detecting a subsequent drag contact movement relative to the alphabetic character to provide a drag signal; and means for changing the alphabetic character from an initial case to a subsequent case upon detection of the drag signal.

24. A portable information processing device having an input device, comprising:

a touch screen for displaying a plurality of characters in a predetermined group adjacent to each other in a first dimensional size, at a first coordinate position on the screen;

an indicator for selecting one of the plurality of characters, by contacting the first coordinate position;

means for identifying the character selected by the indicator;

means for automatically enlarging the selected character to a second dimensional size larger than the first dimensional size at the first coordinate position on the screen to increase its visibility on the screen; and means for inputting the selected character into storage includes removing the indicator from contact with the screen at the first coordination position.

25. A key input method for a portable information processing device comprising a pen, a screen and a tablet, the input method including the steps of:

displaying keys on the screen, each key corresponds to a different single item;

detecting a key corresponding to a latest position of the pen by reading a signal from the tablet when the tablet detects presence of the pen;

determining the key corresponding to the latest position as a provisionally selected key;

changing a part of the keys displayed by the initial display means;

changing the provisionally selected key to another key corresponding to a latest position of the pen;

changing display of a part of the keys when the pen has been dragged on the tablet;

detecting that the pen is lifted up from the tablet; and determining a single item corresponding to the provisionally selected key displayed at a position on the tablet from which the pen has been lifted up as an input item.

26. A medium for a portable information processing device comprising a pen, a screen and a tablet, the medium storing a program for the steps of:

displaying keys on the screen, each key corresponds to a different single item;

detecting a key corresponding to a latest position of the pen by reading a signal from the tablet when the tablet detects presence of the pen;

determining the key corresponding to the latest position as a provisionally selected key;

changing a part of the keys displayed by the initial display means;

changing the provisionally selected key to another key corresponding to a latest position of the pen;

changing a display of a part of the keys when the pen has been dragged on the tablet;

detecting that the pen is lifted up from the tablet; and determining a single item corresponding to the provisionally selected key displayed at a position on the tablet from which the pen has been lifted up as an input item.

27. An input device for a portable information processing device that uses a touch screen that can be contacted by a user, the input device comprising:

a screen;

a transparent tablet which extends across the screen, the tablet detects whether contact is being made to the tablet and a position of a contact point if it is on the tablet, and outputs a signal showing whether contact is made to the tablet and the position of the contact point if it is on the tablet;

initial display means for displaying keys on the screen which each correspond to a single item;

display change means for detecting a latest position of the contact point by reading the signal from the tablet when the tablet detects the presence of the contact point, determining the key corresponding to the latest position as a provisionally selected key, changing a part of the keys displayed by the initial display means, and changing the provisionally selected key to another key corresponding to a latest position of the contact point and further changing a display of a part of the keys when the contact point has been dragged on the tablet; and input determination means for determining, on detecting that contact has been moved from the tablet, a single item corresponding to the provisionally selected key displayed at a position on the tablet from which the contact point has been lifted up as an input item.

28. The input device of claim 27, wherein the transparent tablet is one of a set on the screen and embedded in the screen.

29. The input device of claim 15, wherein the transparent tablet is one of a set on the screen and embedded in the screen.

* * * * *